United States Patent [19]
Miller et al.

[11] Patent Number: 6,145,122
[45] Date of Patent: Nov. 7, 2000

[54] DEVELOPMENT INTERFACE FOR A DATA PROCESSOR

[75] Inventors: Gary Lynn Miller, Round Rock; David Ruimy Gonzales; Gary Lee Whisenhunt, both of Austin, all of Tex.

[73] Assignee: Motorola, Inc., Schaumburg, Ill.

[21] Appl. No.: 09/067,102

[22] Filed: Apr. 27, 1998

[51] Int. Cl.[7] .................................................. G06F 9/45
[52] U.S. Cl. ................................. 717/4; 714/38; 714/45
[58] Field of Search ........................... 717/4, 1–3; 714/25, 714/30, 31–35, 38, 39, 45; 712/227, 24; 703/23–25, 26, 27, 28

[56] References Cited

U.S. PATENT DOCUMENTS

| | | | |
|---|---|---|---|
| 4,429,368 | 1/1984 | Kurii | 714/38 |
| 4,598,364 | 7/1986 | Gum et al. | 714/38 |
| 4,802,119 | 1/1989 | Heene et al. | 364/900 |
| 5,222,226 | 6/1993 | Yamaguchi et al. | 395/425 |
| 5,355,369 | 10/1994 | Greenberger et al. | 714/727 |
| 5,488,688 | 1/1996 | Gonzales et al. | 714/34 |
| 5,533,192 | 7/1996 | Hawley et al. | 714/28 |
| 5,544,311 | 8/1996 | Harenberg et al. | 714/40 |
| 5,590,354 | 12/1996 | Klapproth et al. | 714/30 |
| 5,630,102 | 5/1997 | Johnson et al. | 395/500 |
| 5,675,749 | 10/1997 | Hartivgsen et al. | 395/308 |
| 5,724,505 | 3/1998 | Argade et al. | 714/45 |
| 5,751,942 | 5/1998 | Christensen et al. | 714/38 |
| 5,752,013 | 5/1998 | Christensen et al. | 712/227 |
| 5,771,240 | 6/1998 | Tobin et al. | 714/724 |
| 5,812,562 | 9/1998 | Baeg | 714/726 |
| 5,828,825 | 10/1998 | Eskandari et al. | 714/27 |
| 5,867,644 | 2/1999 | Ranson et al. | 714/39 |
| 5,978,902 | 11/1999 | Mann | 712/227 |
| 6,041,406 | 3/2000 | Mann | 712/227 |

OTHER PUBLICATIONS

U.S. application No. 08/458,390, Hartvigsen et al., Motorola (SC02422A/ (not issued as of Apr. 24, 1998) Patent not issued and not enclosed.

Motorola MCF5202 User's Manual, Section 2 "Signal Description", pp. 2–1—2–10.

Motorola MCF5202 User's Manual, Section 6 "Debug Support", pp. 6–1—6–36.

Motorola CPU12 Reference Manual, Section 8 "Development and Debug Support", pp. 8–1—8–15.

Motorola MC68332 User's Manual Section 5 "Central Processing Unit", pp. 5–16—5–23.

Motorola RCPU Reference Manual, Section 8 "Development Support", pp. 8–1—8–53.

Yokogawa Digital Computer Corporation, Advice Division, "IDB2 Interface Definition", May 10, 1996 Rev. 1.30, 100 pgs.

Haller, "On–Chip–Debug simplifies embedded system test", Test & Measurement World, Jun. 1997, pp. 65–70.

Berg et al., "A real time integrated environment for Motorola 680xx–based VME and FASTBUS modules", IEEE Transactions on Nuclear Science, vol. 36, No. 5, Oct. 1989, pp. 1701–1705.

Geoff Revill, "Advanced on–chip debug for Coldfire developers", Embedded system engineering, Apr./May 1997, pp. 52–54.

*Primary Examiner*—Kakali Chaki
*Attorney, Agent, or Firm*—Susan C. Hill; Robert L. King

[57] ABSTRACT

In one embodiment, a development interface (14) for a data processor (10) includes development registers (39), auxiliary pin interface and control (32), auxiliary pins (31), and a JTAG controller (4)).

65 Claims, 19 Drawing Sheets

BTM = BRANCH TRACE MESSAGING
DWM = DATA WRITE MESSAGING
READI = REAL-TIME EMBEDDED APPLICATION DEVELOPMENT INTERFACE
JTAG = JOINT TEST ACTION GROUP
I/D BUS = INSTRUCTION/DATA BUS

| DESCRIPTION OF READI AUXILIARY PINS ||
|---|---|
| READI AUXILIARY PINS 31 | DESCRIPTION OF AUXILIARY PINS |
| TDIO[0:M] 50 | TDIO[0:M] ARE I/O PINS USED FOR BRANCH TRACE MESSAGING, DATA WRITE MESSAGING, AND FOR MEMORY SUBSTITUTION. RISING EDGE OF TCKO (OR MCU/MPU SYSTEM CLOCK) IS USED FOR LATCHING. 1, 2, 4, 8 OR MORE PINS MAY BE IMPLEMENTED DEPENDING UPON BANDWIDTH REQUIREMENTS. |
| $\overline{TTSE}$[0:N] 51 | $\overline{TTSE}$[0:N] (TRANSFER START/PACKET END) ARE I/O PINS WHICH PROVIDE (1) INDICATION FOR WHEN TCODE IS BEING TRANSFERRED FOR DECODE AND (2) TRANSFER END INDICATION FOR VARIABLE LENGTH TCODE OR OTHER INFORMATION PACKETS. ONLY 1 TTSE PIN IS REQUIRED BUT 2 OR MORE MAY BE IMPLEMENTED FOR MORE EFFICIENT TRANSFERS. |
| TEVT 52 | TEVT IS AN OUTPUT PIN WHICH SIGNALS THE OCCURRENCE OF AN INTERNAL BREAKPOINT. TEVT SIGNALS THE OCCURRENCE AND ENCODES THE SOURCE (1 OF 4 OR 1 OF 8) OF AN INTERNAL BREAKPOINT. |
| TCKO 53 | TCKO IS AN OUTPUT CLOCK TO DEVELOPMENT TOOLS FOR TRANSFERS THROUGH TDIO[0:M]. TCKO CAN BE INDEPENDENT OF MCU SYSTEM CLOCK. IF AN MCU/MPU SYSTEM CLOCK PIN EXISTS, HOWEVER, AND MEETS TDIO[0:M] TRANSFER REQUIREMENTS THEN THE TCKO PIN IS OPTIONAL. |

*FIG.3*

| EXAMPLES OF READI AUXILIARY PIN OPTIONS ||||||  |
|---|---|---|---|---|---|---|
| NUMBER OF PINS FOR EACH OPTION |||||| COMMENTS |
| OPTION | TDIO 50 | TTSE 51 | TEVT 52 | TCKO 53 | TOTAL PINS | |
| A | 1 | 1 | 1 | 0 | 3 | BASE IMPLEMENTATION |
| B | 2 | 1 | 1 | 0 | 4 | 2X FASTER THAN BASE IMPLEMENTATION |
| C | 4 | 1 | 1 | 0 | 6 | 4X FASTER THAN BASE IMPLEMENTATION |
| D | 4 | 2 | 1 | 0 | 7 | 1 CLOCK FASTER THAN C PER TRANSFER |
| E | 8 | 2 | 1 | 0 | 11 | 8X FASTER THAN BASE IMPLEMENTATION |
| F | 1 | 1 | 1 | 1 | 4 | INDEPENDENT CLOCK ALLOWS FOR FASTER OR SLOWER TRANSFER RATE THEN WITH MCU/MPU SYSTEM CLOCK REFERENCE. |
| G | 2 | 1 | 1 | 1 | 5 | ″ |
| H | 4 | 1 | 1 | 1 | 7 | ″ |
| I | 4 | 2 | 1 | 1 | 8 | ″ |
| J | 8 | 2 | 1 | 1 | 12 | ″ |

*FIG.4*

| DESCRIPTION OF PUBLIC TCODES ||| 
|---|---|---|
| TCODE NUMBER | TCODE NAME | PACKETS OF INFORMATION TRANSFERRED |
| 0 | DEBUG STATUS | INDICATES WHEN PROCESSOR IS HALTED |
| 1 | DIRECT BRANCH MESSAGING | SOURCE PROCESSOR (1 OF N), NUMBER OF SEQUENTIAL INSTRUCTIONS EXECUTED SINCE LAST TAKEN BRANCH |
| 2 | INDIRECT BRANCH MESSAGING | SOURCE PROCESSOR (1 OF N), NUMBER OF SEQUENTIAL INSTRUCTIONS EXECUTED SINCE THE LAST BRANCH, UNIQUE PORTION OF THE TARGET ADDRESS FOR TAKEN BRANCHES |
| 3 | DATA WRITE MESSAGING | UNIQUE PORTION OF THE DATA WRITE ADDRESS, DATA WRITE VALUE |
| 4 | VIRTUAL MEMORY ACCESS (FROM MCU/MPU) | INSTRUCTION/DATA, SIZE, UNIQUE PORTION OF THE TARGET ADDRESS |
| 5 | VIRTUAL MEMORY TRANSFER (FROM DEVELOPMENT TOOLS) | TRANSFER INSTRUCTION OR DATA (INPUT TO MCU/MPU) |
| 6 | VIRTUAL MEMORY COMPLETE (FROM DEVELOPMENT TOOLS) | LAST TRANSFER OF INSTRUCTION OR DATA (INPUT TO MCU/MPU) |
| 7 | DATA MESSAGING | DISPLAY DATA ID TAG, NUMBER OF DATA TO BE DISPLAYED, DATA VALUE(S) |
| 8 | OVERRUN | ERROR CODE FOR OVERRUN (INDICATES TYPE OF OVERRUN) |
| 9 | SYNCHRONIZATION | SOURCE PROCESSOR (1 OF N), CURRENT INSTRUCTION ADDRESS |
| 10-31 | RESERVED | RESERVED |
| 32 AND GREATER | VENDOR-DEFINED | VENDOR-DEFINED |

| | PUBLIC TCODE PACKET INFORMATION | | |
|---|---|---|---|
| TCODE NAME | MINIMUM PACKET SIZE (BITS) | PACKET TYPE | PACKET DESCRIPTION |
| DEBUG STATUS | 4 | FIXED | TCODE NUMBER = 0 INDICATES WHEN PROCESSOR IS HALTED |
| DIRECT BRANCH MESSAGING | 4 | FIXED | TCODE NUMBER = 1 |
| | 1 | FIXED | SOURCE PROCESSOR (1 OF N) |
| | 1 | VARIABLE | NUMBER OF SEQUENTIAL INSTRUCTIONS EXECUTED SINCE LAST TAKEN BRANCH |
| INDIRECT BRANCH MESSAGING | 4 | FIXED | TCODE NUMBER = 2 |
| | 1 | FIXED | SOURCE PROCESSOR (1 OF N) |
| | 1 | VARIABLE | NUMBER OF SEQUENTIAL INSTRUCTIONS EXECUTED SINCE LAST TAKEN BRANCH |
| | 1 | VARIABLE | UNIQUE PORTION OF THE TARGET ADDRESS FOR TAKEN BRANCHES AND EXCEPTIONS |
| DATA WRITE MESSAGING | 4 | FIXED | TCODE NUMBER = 3 |
| | 1 | VARIABLE | UNIQUE PORTION OF THE DATA WRITE ADDRESS |
| | 8 | VARIABLE | DATA WRITE VALUE |
| VIRTUAL MEMORY ACCESS (FROM MCU/MPU) | 4 | FIXED | TCODE NUMBER = 4 |
| | 1 | FIXED | INSTRUCTION/DATA |
| | 2 | FIXED | SIZE |
| | 1 | VARIABLE | UNIQUE PORTION OF THE TARGET ADDRESS |
| VIRTUAL MEMORY TRANSFER (FROM DEVELOPMENT TOOLS) | 4 | FIXED | TCODE NUMBER = 5 |
| | 8 | VARIABLE | TRANSFER INSTRUCTION OR DATA (INPUT TO MCU/MPU) |
| VIRTUAL MEMORY COMPLETE (FROM DEVELOPMENT TOOLS) | 4 | FIXED | TCODE NUMBER = 6 |
| | 8 | VARIABLE | LAST TRANSFER INSTRUCTION OR DATA (INPUT TO MCU/MPU) |
| DATA MESSAGING | 4 | FIXED | TCODE NUMBER = 7 |
| | 1 | VARIABLE | DISPLAY DATA ID TAG |
| | 1 | VARIABLE | NUMBER OF DATA TO BE DISPLAYED |
| | 8 | VARIABLE | DATA VALUE(S) |
| OVERRUN | 4 | FIXED | TCODE NUMBER = 8 |
| | 1 | FIXED | ERROR CODE FOR OVERRUN (INDICATES TYPE OF OVERRUN) |
| SYNCHRONIZATION | 4 | FIXED | TCODE NUMBER = 9 |
| | 1 | FIXED | SOURCE PROCESSOR (1 OF N) |
| | 1 | VARIABLE | CURRENT INSTRUCTION ADDRESS |

| INSTRUCTION REGISTER (IR) OPCODE | | REQUIRED FAST CONFIGURATION AND STATUS |
|---|---|---|
| $10 | ENABLE PROGRAM TRACE | REQUIRED |
| $11 | DISABLE PROGRAM TRACE | REQUIRED |
| $12 | ENABLE DATA TRACE | REQUIRED |
| $13 | DISABLE DATA TRACE | REQUIRED |

*FIG.11*

| INSTRUCTION REGISTER (IR) OPCODE | | RECOMMMENDED FAST CONFIGURATION AND STATUS |
|---|---|---|
| $28 | OVERRIDE MASK FOR INTERRUPTS EXTERNAL TO PROCESSOR | RECOMMENDED |
| $29 | NO OVERRIDE MASK FOR INTERRUPTS | RECOMMENDED |
| $2A | DISABLE SINGLE STEP | RECOMMENDED |
| $2B | ENABLE SINGLE STEP | RECOMMENDED |
| $2C | EXIT DEBUG MODE | RECOMMENDED |
| $2D | REQUEST DEBUG MODE | RECOMMENDED |
| $2E | ENABLE DEBUG MODE | RECOMMENDED |
| $2F | DISABLE DEBUG MODE | RECOMMENDED |

*FIG.12*

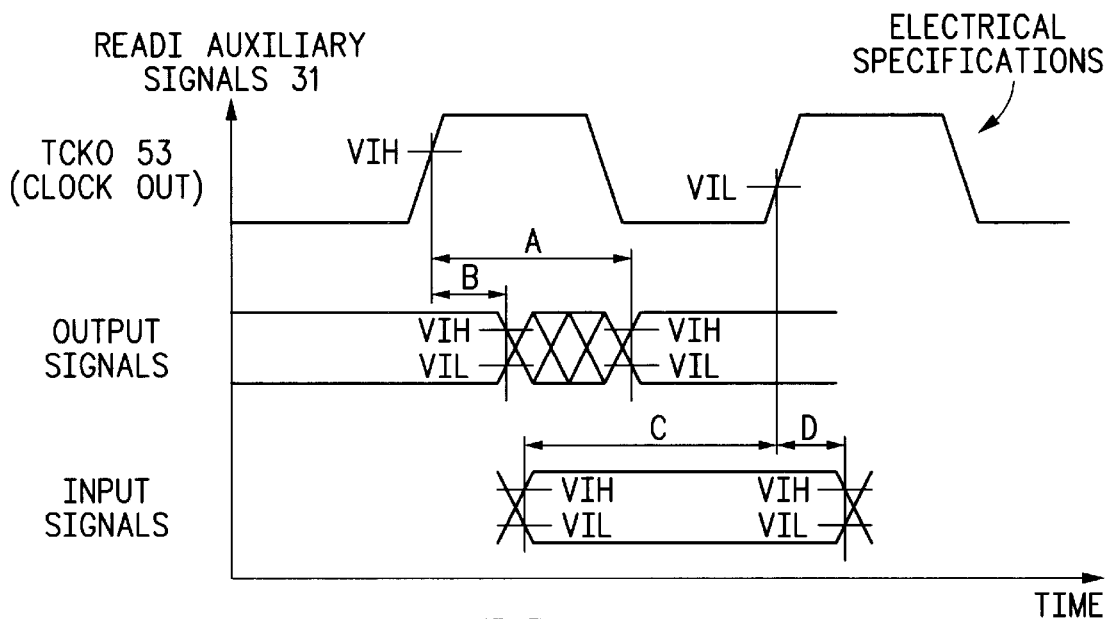

A = MAXIMUM OUTPUT VALID TIME
B = MINIMUM OUTPUT HOLD TIME
C = MINIMUM INPUT SETUP TIME          VIH = VOLTAGE INPUT HIGH
D = MINIMUM INPUT HOLD TIME           VIL = VOLTAGE INPUT LOW

*FIG. 23*

| | ELECTRICAL SPECIFICATIONS OF READI AUXILIARY PINS 31 RELATIVE TO CLOCK FREQUENCY | | | | |
|---|---|---|---|---|---|
| | CHARACTERISTIC | SYMBOL | MIN | MAX | UNIT |
| 1 | TCKO 53 CYCLE TIME | | P | – | NANOSECONDS |
| 2 | TCKO 53 CLOCK PULSE WIDTH | | P/2 | – | NANOSECONDS |
| 3 | TCKO 53 RISE AND FALL TIMES | | 0 | 2 | NANOSECONDS |
| 4 | TDIO 50 INPUT SETUP TIME<br>TTSE 51 INPUT SETUP TIME | C | 0.3*P | – | NANOSECONDS |
| 5 | TDIO 50 INPUT HOLD TIME<br>TTSE 51 INPUT HOLD TIME | D | 0.15*P | – | NANOSECONDS |
| 6 | TDIO 50 OUTPUT VALID TIME<br>TTSE 51 OUTPUT VALID TIME<br>TEVT 52 OUTPUT VALID TIME | A | 0 | 0.6*P | NANOSECONDS |
| 7 | TDIO 50 OUTPUT HOLD TIME<br>TTSE 51 OUTPUT HOLD TIME<br>TEVT 52 OUTPUT HOLD TIME | B | 0.25*P | – | NANOSECONDS |

*FIG. 24*

| OPTION | DIRECT BRANCH | | INDIRECT BRANCH | |
|---|---|---|---|---|
| | CLOCKS/ BRANCH | BRANCHES/ SECOND[1] | CLOCKS/ BRANCH | BRANCHES/ SECOND[2] |
| E (8-BIT TDIO 50) | 2 | 20M | 4 | 10M |
| D (4-BIT TDIO 50) | 3 | 13.33M | 7 | 5.71M |
| B (2-BIT TDIO 50) | 5 | 8M | 13 | 3.08M |
| A (1-BIT TDIO 50) | 9.5 | 4.21M | 25.5 | 1.57M |

NOTES:
 1. ASSUMES 40 MHz CLOCK.
 2. ASSUMES 40 MHz CLOCK.
M = MILLION

*FIG.25*

| OPTION | 32 BIT DATA | | | 16 BIT DATA | | |
|---|---|---|---|---|---|---|
| | CLOCKS/ TRANSFER | CLOCKS/ BYTE | BYTES/ SECOND OF DATA[1] | CLOCKS/ TRANSFER | CLOCKS/ BYTE | BYTES/ SECOND OF DATA[2] |
| E (8-BIT TDIO 50) | 7 | 1.75 | 22.86M | 5 | 2.5 | 16M |
| D (4-BIT TDIO 50) | 13 | 3.25 | 12.31M | 9 | 4.5 | 8.89M |
| B (2-BIT TDIO 50) | 26 | 6.5 | 6.15M | 18 | 9 | 4.44M |
| A (1-BIT TDIO 50) | 52.5 | 13.12 | 3.05M | 36.5 | 18.25 | 2.19M |

NOTES:
 1. ASSUMES 40 MHz CLOCK.
 2. ASSUMES 40 MHz CLOCK.
M = MILLION

*FIG.26*

| BASIC STEPS REQUIRED FOR CALIBRATION CONSTANT TUNING WRITES VIA THE READ/WRITE ACCESS REGISTERS 67 | | |
|---|---|---|
| STEP | JTAG TCK CLOCKS FOR 32-BIT DATA | JTAG TCK CLOCKS FOR 16-BIT DATA |
| 1. SELECT RWAR 101 | 16 | 16 |
| 2. LOAD RWAR 101 | 30 | 14 |
| 3. SELECT RWDR 102 | 16 | 16 |
| 4. LOAD RWDR 102 | 38 | 22 |
| 5. SELECT RWACR 100 | 16 | 16 |
| 6. LOAD RWACR 100 | 38 | 22 |
| TOTAL JTAG TCK CLOCKS | 154 | 106 |
| TOTAL SYSTEM CLOCKS | 616 | 424 |

*FIG.27*

| TRANSFER RATE FOR 32-BIT AND 16-BIT WRITE ACCESSES FOR SINGLE AND BLOCK WRITE ACCESSES | | | | | | |
|---|---|---|---|---|---|---|
| ACCESS | 32 BIT DATA | | | 16 BIT DATA | | |
| | SYSTEM CLOCKS/ TRANSFER | SYSTEM CLOCKS/ BYTE | BYTES/ SECOND OF DATA[1] | SYSTEM CLOCKS/ TRANSFER | SYSTEM CLOCKS/ BYTE | BYTES/ SECOND OF DATA[2] |
| SINGLE WRITE | 616 | 154 | 260K | 424 | 212 | 190K |
| BLOCK WRITE | 216 | 54 | 740K | 152 | 76 | 530K |

NOTES:
1. ASSUMES 40 MHz CLOCK.
2. ASSUMES 40 MHz CLOCK.
K = THOUSAND

*FIG.28*

DEVELOPMENT INTERFACE FOR A DATA PROCESSOR

FIELD OF THE INVENTION

The present invention relates in general to a data processor, and more particularly to a development interface for a data processor.

BACKGROUND OF THE INVENTION

Data processing systems or data processors, such as microcontroller integrated circuits, may have an one or more internal buses which transfers address, data, and/or control information during internal bus cycles. In order to facilitate hardware testing and software program debugging, it is useful for the microcontroller to provide internal bus cycle information to the microcontroller's external bus. In addition, it may be useful to provide external visibility for other portions of a data processing system, such as the contents of registers or the results of self test features. In this manner, test and debug equipment external to the microcontroller is able to monitor the address, data, and control information which is being transferred across the internal bus within a microcontroller. Thus, the activity of the internal bus is made visible to the world outside of the integrated circuit. In addition, it may be particularly difficult to provide the necessary external visibility required for maintenance, servicing, and/or software upgrades once an integrated circuit is embedded into a product, e.g. an engine controller, a communication device, a computing device, etc.

A solution was needed to facilitate hardware testing and ease the task of debugging software being executed by a microcontroller, while not significantly impacting the internal operation, speed, and integrated circuit pin count of the microcontroller.

BRIEF DESCRIPTION OF THE DRAWINGS

FIG. 3 illustrates, in tabular form, a description of READI auxiliary terminals 31 of FIG. 1 in accordance with one embodiment of the present invention;

FIG. 4 illustrates, in tabular form, examples of READI auxiliary terminal options in accordance with one embodiment of the present invention;

FIG. 5 illustrates, in tabular form, a description of public TCODEs in accordance with one embodiment of the present invention;

FIG. 6 illustrates, in tabular form, a description of Public TCODE packet information in accordance with one embodiment of the present invention;

FIG. 11 illustrates, in tabular diagram form, the Required Fast Configuration and Status Registers for the required JTAG IR sequences in accordance with one embodiment of the present invention;

FIG. 12 illustrates, in tabular diagram form, the Recommend Fast Configuration Registers for the recommended JTAG IR sequences in accordance with one embodiment of the present invention;

FIG. 23 illustrates, in timing diagram form, an example of electrical specifications for the READI auxiliary signals 31 of FIG. 1 in accordance with one embodiment of the present invention;

FIG. 24 illustrates, in tabular diagram form, a relationship between electrical specifications and clock frequency for the READI auxiliary signals 31 of FIG. 1 in accordance with one embodiment of the present invention;

FIG. 25 illustrates, in tabular diagram form, the average transfer rate for direct and indirect branches in accordance with one embodiment of the present invention;

FIG. 26 illustrates, in tabular diagram form, the transfer rate for data writes in accordance with one embodiment of the present invention;

FIG. 27 illustrates, in tabular diagram form, basic steps for calibration constant tuning writes in accordance with one embodiment of the present invention; and FIG. 28 illustrates, in tabular diagram form, the transfer rate for selected single and block write accesses in accordance with one embodiment of the present invention.

Figure 1:
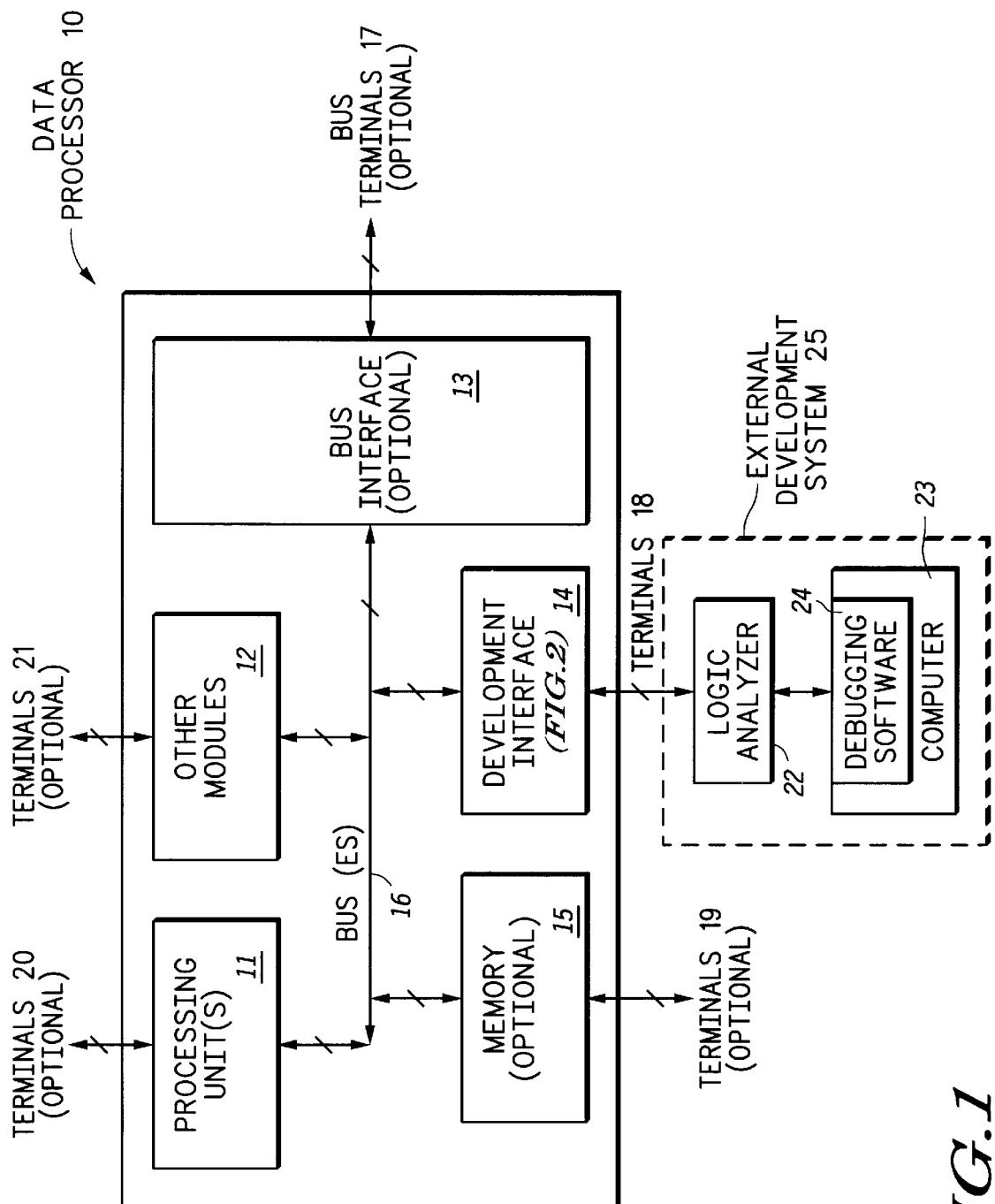
FIG. 1 illustrates, in block diagram form, a data processor in accordance with one embodiment of the present invention.

It will be appreciated that for simplicity and clarity of illustration, elements illustrated in the drawings have not necessarily been drawn to scale. For example, the dimensions of some of the elements are exaggerated relative to other elements for clarity. Further, where considered appropriate, reference numerals have been repeated among the drawings to indicate corresponding or analogous elements.

DETAILED DESCRIPTION

This document describes one embodiment of a development pin interface for a data processor. The following table defines a number of terms that will be used thoughout this document. In addition, the terms "terminals" and "pins" will be used interchangeably to refer to any physical conductor, device, or mechanism that is used to transfer information between a data processor and the external world.

| Term | Description |
| --- | --- |
| Address | The term is used to indicate virtual address. If there is no address translation in an application then it also refers to the physical address. |
| Automotive Powertrain Development | Development of engine and transmission engine control unit hardware and software |
| Branch Trace Messaging | Visibility of addresses for taken branches and exceptions, and the number of sequential instructions executed between each taken branch |
| Data Breakpoint | Processor is halted at an appropriate instruction boundary after a trigger is set at a data valid time. The trigger is set when the data address and/or value matches a pre-selected address and/or value. |
| Calibration Constants | Performance and drivability related constants which must be tuned for each automotive vehicle line |
| Calibration Variables | Intermediate calculations which must be visible during the calibration process to enable accurate tuning of calibration constants. |
| Data Messaging | Visibility of related data parameters stored in internal resources e.g. related calibration variables for automotive applications |
| Data Write Messaging | Visibility of data writes to internal memory-mapped resources e.g. on-chip RAM |
| ECU | Engine Control Unit |
| Hardware Breakpoint | Typically a hardware comparator used to halt the processor at an appropriate instruction boundary after an address or data value matches a pre-selected address or data value. |
| Instruction Breakpoint | Processor is halted when all previous instructions are retired and just prior to when any architectural state is changed by the instruction associated with a pre-selected address |
| IR | Instruction Register |
| Instrumentation | Development tools used by automotive developers |
| JTAG | Joint Test Action Group |
| JTAG IR Sequence | JTAG Instruction Register (IR) scan to load an IR value. The IR value may enable or disable a development feature or select a development register to access via a JTAG Data Register (DR) scan. |
| JTAG IR & DR Sequence | JTAG Instruction Register (IR) scan as described above plus a Data Register (DR) scans to load or read the selected DR. |
| PC Trace | Trace of program counter or executed instructions |
| READI | Real-Time Embedded Application Development Interface |
| ROM | Read-Only Memory such as non-volatile flash |
| TCODE | Transfer Code |
| Virtual Memory Messaging (VMM) | Messaging for a virtual memory access in which internal accesses are re-directed and preformed through the auxiliary pins defined in the standard. |
| Watchpoint | A Data or Instruction Breakpoint which does not cause the processor to halt. Instead a pin is used to signal that the condition occurred. |
| 0 × 0F | Hexadecimal numbers |
| 0b0011 | Binary numbers |

Basic Development Needs for Embedded microcontrollers (MCUs) and Microprocessors (MPUs)

The term "embedded developers" refers to hardware and software developers that develop hardware or software for a product which internally contains one or more integrated circuits. Embedded developers have certain needs of their development tools in order to accomplish their jobs. For logic analysis the basic needs are:

1. To access instruction trace information with acceptable impact to the system under development. The developer needs to be able to interrogate and correlate instruction flow to real world interactions
2. To retrieve information on how data flows through the system with acceptable impact to the system under development, and to understand what system resource (s) are creating and accessing data
3. To assess whether embedded software is meeting the required performance with acceptable impact to the system under development For run control the basic needs of development tools are:

1. To query and modify all memory-mapped locations when the processor is halted.
2. To support breakpoint/watchpoint features in debuggers, either as hardware (HW) or software (SW) breakpoints depending on the architecture. Configuration of breakpoint/watchpoint features may be performed when the processor is halted.

Additional Needs for Automotive Powertrain Development

Automotive powertrain development has some of the more stringent requirements for development systems, and thus will be specifically discussed. Note, however, that automotive powertrain development is being discussed merely as one example of an application in which an improved development interface is needed.

The automotive powertrain development cycle includes additional needs for calibration of performance and drivability related constants which are tuned for each automotive platform. The calibration process is performed during run time. For calibration the basic needs for development tools are:

1 To acquire while running an engine or vehicle crank shaft synchronous data relating to calibration factors as they are being used or modified during high speed transient events with acceptable impact to the system under development.
2 To acquire while running an engine or vehicle time synchronous data relating to calibration factors as they are being used or modified during high speed transient events with acceptable impact to the system under development.
3 To coherently modify table(s) of calibration constants while the ECU is running an engine or vehicle.

Required Development Features for Embedded MCUs and MPUs

Due to the evolution of high-performance microprocessors (MPUs) and highly integrated microcontrollers (MCUs) there has been an impact on development processes and tools. High performance on-chip caches, flash and Static Random Access Memory (SRAM), and other changes have eliminated the internal visibility needed for instruction and data trace. Thus there are specific features the READI standard should address as listed below:

1. Program trace visibility is needed for development tools with acceptable impact to the system under development. With on-chip high performance instruction cache and flash visibility needed for program trace is restricted. In some applications the external bus is used for a secondary function such as general purpose I/O, or is not available.

2. Data trace visibility is needed for development tools with acceptable impact to the system under development. With on-chip high performance data cache and SRAM the visibility needed for data trace is restricted.

3. A standard development methodology and tool set is needed for embedded applications such as powertrain and communications. Since MCU/MPU vendors generally do not support the same development interface/methodology across MCU/MPU architectures, development methodology and tools are not always compatible.

4. A development pin interface standard is needed to support development with multiple processors on the embedded MCU or MPU. This includes basic visibility and controllability of each processor independently.

5. An embedded development pin interface standard is needed to provide off-board arbitration for connection to multiple external development tools (e.g. external development system 25 in FIG. 1). In one embodiment, external development system 25 includes a logic analyzer 22 coupled to a computer 23. The computer includes debugging software 24. Arbitration signals and a protocol should support two or more development tool boxes connected to the same board connector.

6. Multiplexing of development pin functions should be performed in a manner so that undue constraints are not placed on the developer. MCU vendors often multiplex development pins with general purpose inputs and outputs (GPIO) which can make logic analysis tools exhibit unpredictable behaviors and anomalies that developers consider undesirable.

7. A scalable development pin interface standard is needed which will work for different price targets of embedded MCUs/MPUs. There is currently no industry standard embedded development pin interface on which developers can leverage.

8. An embedded development pin interface standard is needed for cost-effective tools.

9. A command protocol/API is needed for the basic operation of the embedded development pin interface standard. This would include the command protocol for basic operations such as stop, start, reset, single step, set breakpoints and watchpoints, read and write internal memory mapped resources, etc. The command protocol/API would help to ensure software development tool re-use for embedded MPUs/MCUs.

JTAG-Based Development Interface Standard for Embedded Applications

The JTAG test standard is a well known standard in the data processing art. In addition to normal JTAG pin usage the following features may be used with the JTAG pins TCK, TMS, TDI, TDO and TRST in one embodiment of the present invention. Note that in alternate embodiments of the present invention, any combination of JTAG or non-JTAG pins could be used.

JTAG Instruction Register (IR) sequences for fast configuration and status for the most common embedded MCU/MPU development features and operations JTAG IR and Data Register (DR) sequences for accessing standard development registers for configuration and status of other embedded MCU/MPU development features and operations JTAG IR and DR sequences for read/write access to internal memory-mapped resources during runtime In one embodiment of the present invention, auxiliary pins 31 (see FIG. 2) may be used with the standard JTAG pins to allow for the following general development features:

Program trace via Branch Trace Messaging (BTM)

Data trace via Data Write Messaging (DWM)

Runtime memory substitution for internal ROM via Virtual Memory Messaging) (VMM)

Breakpoints and Watchpoints

Other high-bandwidth information transfer (Vendor-Defined)

In addition, for automotive powertrain applications auxiliary pins 31 may be used with the standard JTAG pins to allow for the following feature:

Calibration variable acquisition via DWM or Data Messaging (DM)

In one embodiment of the present invention, all of these features can be provided with a minimum of three auxiliary pins 31, depending upon the transfer bandwidth requirement for an application. In one embodiment, the present invention allows for greater transfer bandwidth in one of two ways: with a scaleable pin interface to transfer more bits each clock and/or a faster transfer clock to transfer more bits per unit time. Alternate embodiments of the present invention may use alternate approaches to increase transfer bandwidth. In one embodiment of the present invention, up to twelve or more auxiliary pins 31 may be implemented to fulfill transfer bandwidth requirements e.g. options for 4, 5, 6, 7, 8, or 11 pins. Alternate embodiments of the present invention may use any number of auxiliary pins 31.

Figure 2:
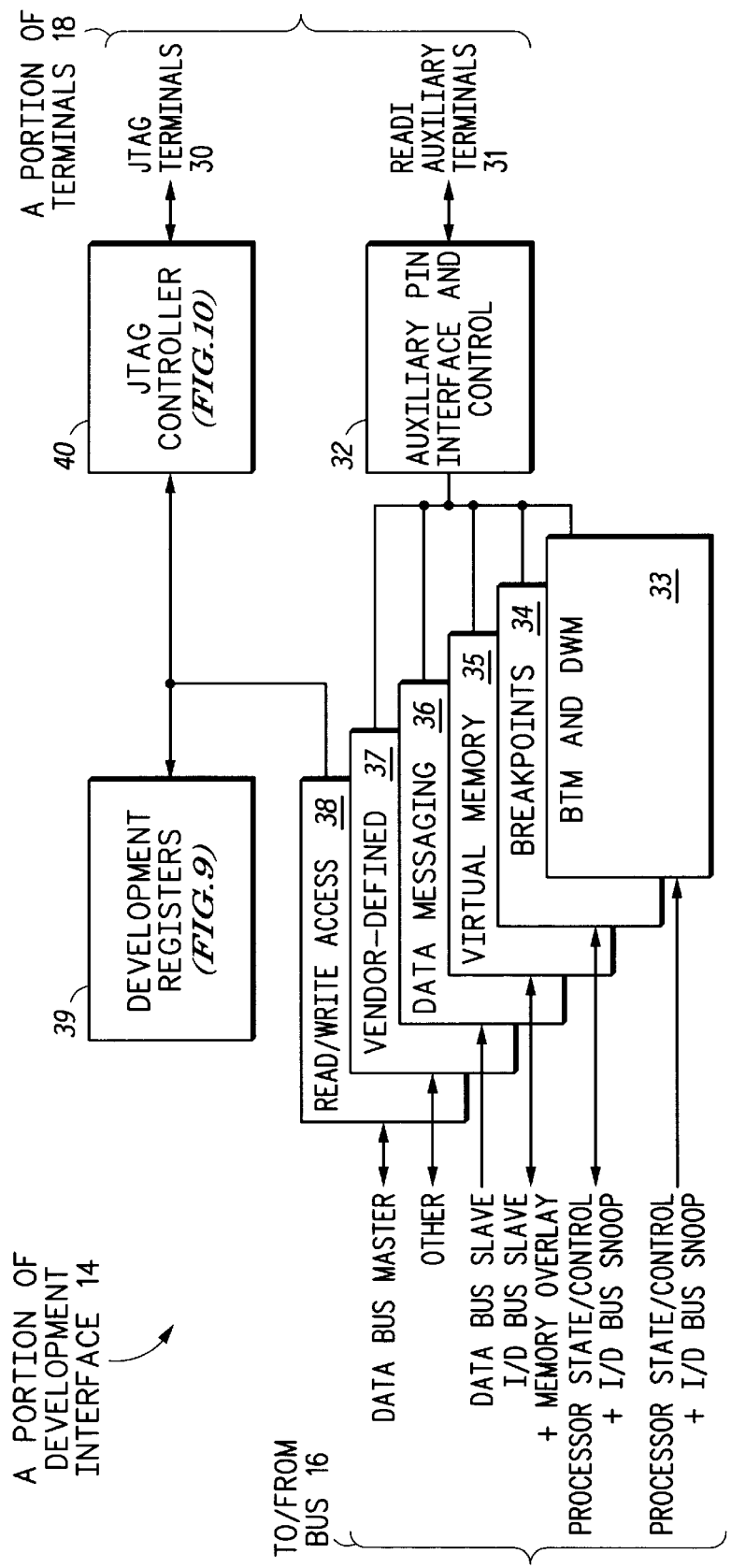
FIG. 2 illustrates, in block diagram form, a portion of development interface 14 of FIG. 1 in accordance with one embodiment of the present invention.

Referring to FIG. 2, a portion of development interface 14 of FIG. 1 illustrates the functional blocks for a full implementation of one embodiment of the READI development interface. Note that only the JTAG controller 40, the Auxiliary Pin Interface & Control 32, and the branch trace messaging (BTM) & data write messaging (DWM) block 33 are required for one embodiment of a minimum implementation where the minimum implementation provides support for program and data trace only.

Summary and Classification of Development Features

A summary of the REQUIRED, RECOMMENDED, PUBLIC, AND VENDOR-DEFINED development features for one embodiment of the development interface is described herein below. The composition of these features allow for broad flexibility in implementation.

REQUIRED JTAG IR sequences for compliance to one embodiment of the present invention are defined herein. These JTAG IR sequences are used for fast configuration and status for the most common embedded MCU/MPU development features and operations.

RECOMMENDED development registers and associated features accessed via JTAG IR and DR sequences are defined herein. These registers and features are recommended for new designs but are not required.

In one embodiment of the present invention, PUBLIC transfer operations are defined for the auxiliary pins 31 and must be used for designated functions if these functions are implemented. Public transfer operations are specified pin protocols for accomplishing common visibility and controllability requirements.

In one embodiment of the present invention, VENDOR-DEFINED JTAG IR sequences, JTAG IR and DR sequences, and transfer operations are also allowed for vendor-specific development features and operations, register access and transfer operations respectively.

Categories for Development Features within the Standard

To clarify the application of the development features within the standard each of the features are classified into the following categories:

1 Required/Recommended for all real-time embedded applications
2 Required/Recommended for automotive powertrain applications
3 Feature is active or enabled when the processor is halted/running Fast Configuration and Status This feature provides JTAG IR sequences for fast configuration and status for the most common embedded MCU/MPU development features and operations. In one embodiment of the present invention, the JTAG IR sequences include two classifications: required and recommended.

In one embodiment of the present invention, Vendor-Defined JTAG IR sequences are also allowed for vendor-specific development features and operations.

Required Fast Configuration and Status

Application: Required for All Real-Time Embedded Applications Active when: Processor Running In one embodiment of the present invention, the required JTAG IR sequences include the following 1 Enable/disable program trace
2 Enable/disable data trace The exact JTAG IR sequence for each of the above for one embodiment of the present invention is described in the Required Fast Configuration and Status table (see FIG. 11).

Recommended Fast Configuration and Status

Application: Recommended for All Real-Time Embedded Applications Active when: Processor Running The recommended JTAG IR sequences for one embodiment of the present invention include the following 1 Enable/disable debug mode
2 Request/exit debug mode
3 Enable/disable single step
4 Mask/Do not mask interrupts external to processor (overriding user-configured masking of interrupts external to processor)

The exact JTAG IR sequence for each of the above for one embodiment of the present invention is described in the Recommended Fast Configuration and Status table (see FIG. 12).

Standardized Development Registers

Application: Recommended for All Real-Time Embedded Applications Active when: Processor Running This feature provides JTAG IR and DR sequences for accessing standard development registers for configuration and status of other embedded MCU/MPU development features and operations. In one embodiment of the present invention, the development registers 39 (see FIGS. 2 and 9) include:

1 Development Control Register
2 Development Status Register
3 Breakpoint registers including one or more Breakpoint Control Registers, Breakpoint Address Registers and Breakpoint Data Registers
4 Read/write Access Registers including Read/Write Access Control Register, Read/Write Address Register, and Read/Write Data Register The bit fields for one embodiment of these registers are defined herein. Alternate embodiments of the present invention may define and use different bit fields with these registers.

Figure 9:
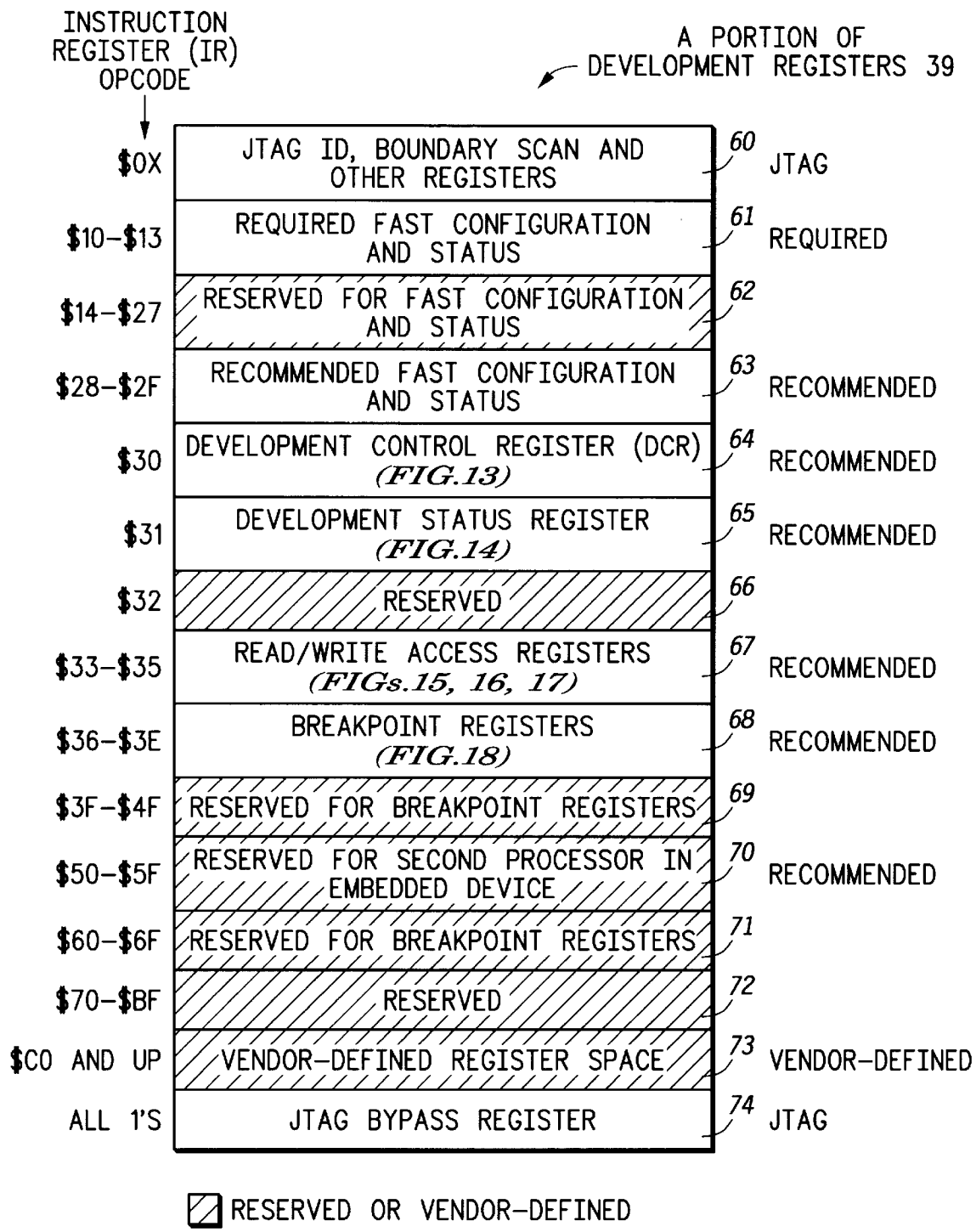
FIG. 9 illustrates, in block diagram form, a portion of development registers 39 of FIG. 2 in accordance with one embodiment of the present invention.

In one embodiment of the present invention, Vendor-Defined JTAG IR and DR sequences are also allowed for vendor-specific development registers that may be located in Vendor-Defined register space 73 (see FIG. 9).

Read/Write Access to Internal Memory-Mapped Resources

Application: Required for Automotive Powertrain Applications; Recommended for All Real-Time Embedded Applications Active when: Processor Running In one embodiment of the present invention, the Read/Write Access feature provides JTAG IR and DR sequences for read/ write access to internal memory-mapped resources during runtime. Refer to Calibration Constant Tuning for an explanation of how this feature is used for automotive powertrain applications. This feature also supports runtime development visibility needed for other real-time embedded applications.

The Read/Write Access Registers 67 (see FIGS. 9 and 15) include Read/Write Access Control Register 100, Read/Write Address Register 101, and Read/Write Data Register 102.

Program Trace

Application: Required for All Real-Time Embedded Applications Active when: Processor Running In one embodiment of the present invention, the program trace feature implements a Program Flow Change Model in which program trace is synchronized at each program flow discontinuity. A program flow discontinuity occurs at taken branches and exceptions. A BTM technique is used to display program flow discontinuities via the auxiliary pins 31. Development tools can interpolate what transpires between program flow discontinuities by correlating information from BTM and static source code files. Self-modifying code cannot be traced with the Program Flow Change Model as the source code is not static.

For some embodiment of the present invention, it is assumed that a Pipeline Tracking Model in which program trace is synchronized at each instruction executed is not required for real-time embedded applications. Alternate embodiments of the present invention may not require this assumption.

Branch Trace Messaging (BTM)

BTM facilitates program trace by providing several key types of visibility. The visibility includes the following 1 Messaging for taken direct branches includes how many sequential instructions were executed since the last taken branch or exception, and an indication of which 1 of N processors took the branch. Direct branches not taken are counted as sequential instructions.
2 Messaging for taken indirect branches and exceptions includes how many sequential instructions were executed since the last taken branch or exception, the unique portion of the branch target address or exception vector address, and an indication of which 1 of N processors took the branch. Indirect branches not taken are counted as sequential instructions.

"Direct" change of program flow is a change of program flow for which the target address is discernible from a static analysis of the software being executed. "Indirect" change of program flow is a change of program flow for which the target address is not discernible from a static analysis of the software being executed.

The information regarding the number of instructions executed since the last taken branch is used to facilitate the following:

1. Trace which direct branch is taken.
2. Detect which instruction may have caused an exception.

The unique portion of the indirect branch target address displayed on the auxiliary pins 31 is in relation to the prior indirect branch target address displayed.

BTM Overrun

In one embodiment of the present invention, if a condition occurs in which there is an overrun of BTM due to implementation in a vendor application, an Error Message may be displayed on the auxiliary pins 31. The Error Message may be used by development tools to notify the developer that some program trace information was lost. An optional feature may be implemented to delay the data processor 10 (see FIG. 1) to avoid BTM overruns.

The Overrun Message may include an indication of which 1 of N data processors generated an overrun and an error code which identifies the type of overrun. In one embodiment, an error code of 1 identifies a BTM overrun.

Synchronization

Due to the nature of some processor architectures, such as RISC processors, some application programs may include a significant number of direct branch instructions and very few indirect branch instructions. Since BTM for taken direct branches does not provide the target address, program trace for these application programs must be accomplished in a relative manner (possibly without branch target address information). In one embodiment of the present invention, the Synchronization Message can ensure that development tools fully synchronize with the program flow regularly.

In one embodiment of the present invention, a Synchronization Message will be displayed as the initial program trace message when the embedded MPU/MPC comes out of reset, following an Overrun Message related to a BTM overflow, and periodically during runtime. In one embodiment of the present invention, the frequency of the Synchronization Message may be defined by the vendor during runtime.

In one embodiment of the present invention, the Synchronization Message includes an indication of which 1 of N processors is being synchronized and the full address of a recently executed instruction.

Data Trace

Application: Required for All Real-Time Embedded Applications Active when: Processor Running In one embodiment of the present invention, the data trace feature provides the capability to generate, with minimal impact on the embedded software, an external image of Vendor-Defined internal peripheral or memory locations. Data writes to the selected internal locations are monitored and provided via the auxiliary pins 31 with DWM.

Data Write Messaging (DWM)

DWM facilitates data trace by providing several key types of visibility. The messaging for data writes includes the unique portion of the data write address and the data write value. The unique portion of the data write address displayed on the auxiliary pins 31 is in relation to the prior data write address displayed.

DWM Overrun

In one embodiment of the present invention, if a condition occurs in which there is an overrun of DWM due to implementation in a vendor application, an Error Message may be displayed on the auxiliary pins 31. The Error Message may be used by development tools to notify the developer that some data trace information was lost. An optional feature may be implemented in some embodiments of the present invention to delay the data processor 10 (see FIG. 1) to avoid DWM overruns.

The Overrun Message includes an indication of which 1 of N processors generated an overrun and an error code which identifies the type of overrun. An error code of 2 identifies a DWM overrun.

Memory Substitution for Internal ROM

Application: Recommended for All Real-Time Embedded Applications Active when: Processor Running (but Could Be Waiting for Virtual Memory Transfer)

The memory substitution feature facilitates the software development process and allows for the possibility of runtime substitution for portions of internal ROM (e.g. memory 15, see FIG. 1) via the auxiliary pins 31 (see FIG. 2). The access rate for the memory substitution feature is determined by the vendor's implementation of the scaleable auxiliary pin interface and control 32 (see FIG. 2), and the portion of auxiliary pin 31 bandwidth allocated for this feature if other messaging activity is also enabled at the same time.

The memory substitution feature can be enabled to allow the following operands to be substituted via the auxiliary pins 31:

1 Both data and instructions

2 Instructions only

3 Data only

The operands which are not enabled for memory substitution will be accessed normally from the internal memory-mapped resource designated by the access attributes.

The memory substitution feature can be activated for software development during reset by negating a designated auxiliary pin 31. After reset is negated the data processor 10 will make memory-mapped accesses via the auxiliary pins 31 (instead of internal memory-mapped resources).

The memory substitution feature can be activated for runtime code or data substitution of internal ROM by setting a designated watchpoint to begin memory substitution. When the watchpoint occurs, the data processor 10 will make memory-mapped accesses via the auxiliary pins 31 (instead of internal memory-mapped resources).

The memory substitution feature is provided by virtual memory messaging (VMM).

Virtual Memory Messaging (VMM)

VMM facilitates memory substitution by providing a virtual memory access and several types of virtual memory transfers. Alternate embodiments of the present invention may provide more, fewer, or different virtual memory transfers. In addition, some embodiments may not even provide this feature. In one embodiment of the present invention, the virtual memory transfers include the following:

1 Messaging for a virtual memory access provided from data processor 10 to an external development tool includes access attributes such as instruction/data, size, and the unique portion of the memory-mapped address.

2 Messaging for a virtual memory transfer provided from an external development tool to data processor 10 which includes the instruction or data specified by access attributes.

3 Messaging for the last virtual memory transfer provided from an external development tool to data processor 10, which includes the last instruction or data specified by access attributes and a disable command for virtual memory messaging. Subsequent memory-mapped accesses will be accessed normally from the internal memory-mapped resource designated by the access attributes.

In one embodiment of the invention, the unique portion of the memory-mapped address displayed on the auxiliary pins 31 is in relation to the prior memory-mapped address displayed. Alternate embodiments of the present invention may provide the unique portion of the memory-mapped address in other ways.

In one embodiment of the invention, a virtual memory messaging sequence may include the following steps:
1. Data processor 10 provides messaging for a virtual memory access containing access attributes.
2. External development tool provides one of following: (a) messaging for a virtual memory transfer containing the next instruction or data value or (b) messaging for the last virtual memory transfer containing the last instruction or data value.
3. Steps 1 & 2 are repeated until the last instruction or data value is provided by a development tool. Then the memory substitution feature is disabled and normal accesses resume to the internal memory-mapped resource designated by the access attributes.

Breakpoints and Watchpoints

Application: Recommended for All Real-Time Embedded Applications Active when: Processor Running (configuration may occur when the processor is halted)

The breakpoint and watchpoint features may be used to facilitate the software development process for some embodiments of the present invention by allowing the software developer to halt at a specific processor state or to signal a specific processor state. If there is an internal ROM (e.g. memory 15, see FIG. 1), or if a breakpoint or trap instruction does not exist in the vendor's architecture, then this feature may become a valuable tool for development. Alternate embodiments of the present invention may provide more, fewer, or different breakpoint and watchpoint features. In addition, some embodiments may not even provide this feature. In one embodiment of the present invention, breakpoints and watchpoints may include the following:
1 Data breakpoint—data processor 10 is halted at an appropriate instruction boundary after a trigger is set at a data valid time. The trigger is set when the data address and/or data value matches a pre-selected address and/or value.
2 Instruction breakpoint—data processor 10 is halted when all previous instructions are retired and just prior to when any architectural state is changed by the instruction associated with a pre-selected address.
3 Watchpoint—a data or instruction breakpoint which does not cause the processor to halt. Instead a designated auxiliary pin 31 is used to signal to an external development system that the condition occurred.

In one embodiment of the present invention, data processor 10 may implement specific breakpoints in the Vendor-Defined register space. Alternate embodiments of the present invention may implement specific breakpoints by any compatible alternate manner. For example, one method of implementing breakpoints and watchpoints is described in the section on Breakpoint Registers 68 (see FIG. 18 and corresponding text).

Calibration Variable Acquisition

Application: Required for Automotive Powertrain Applications Active when: Processor Running In one embodiment of the present invention, the calibration variable acquisition feature is provided by either of DWM or DM. Alternate embodiments may provide the calibration variable acquisition feature in a different manner, or may not provide this feature at all. Calibration variables are defined to be intermediate calculations which must be visible during the calibration process to enable accurate tuning of calibration constants. When calibration variables are stored in internal RAM (e.g. memory 15, see FIG. 1), the data must be acquired from the target platform during runtime (e.g. from the automobile engine for an engine controller, from the external development system during development).

Data Messaging (DM)

The DM feature provides the capability to package and display on the auxiliary pins 31 (see FIG. 2) data related to one another, such as crank shaft synchronous calibration variables. For some embodiments of the present invention, due to the simpler transfer operation for DM, DM may be a more efficiently packed transfer operation then DWM.

DM facilitates calibration variable acquisition by providing several key types of visibility. The visibility includes messaging for display data ID tag, number of datum to be displayed, and the data value(s).

Calibration Constant Tuning

Application: Required for Certain Applications (e.g. Automotive Powertrain Application Active when: Processor Running In one embodiment of the present invention, features are provided to support calibration constant tuning. For calibration constant tuning there are a wide range of implementation preferences, particularly among certain specific applications, such as automotive powertrain developers. In addition vendor architectures are a determining factor in the eventual solution. Thus no specific requirement for a calibration constant tuning feature is required by the present invention.

However, some embodiments of the present invention may include the necessary features to allow for calibration constants to be transferred to a vendor-proprietary calibration tuning block internal to the embedded device (e.g. data processor 10, see FIG. 1). Using the standardized JTAG IR and DR sequences for read/write access to internal peripheral registers and memory locations during runtime, the calibration tuning block can be loaded efficiently for some embodiments of the present invention. Using the read/write feature, a wide range of calibration tuning solutions can be implemented with few limitations.

Auxiliary Pins

One possible embodiment of the auxiliary pins 31 (see FIG. 2) are described in FIG. 3.

Referring to FIG. 3, for a robust development port with low bandwidth requirements an implementation with three auxiliary pins 31 is possible utilizing TDIO, TTSE and TEVT. Alternate embodiments of the present invention may allow for additional transfer bandwidth with a scaleable auxiliary pin interface and control 32 (see FIG. 2) or transfer rate as illustrated by the examples in FIG. 4.

If breakpoints and watchpoints are not required in a vendor's application then the TEVT pin 52 does not need to be implemented.

The present invention allows for embedded MPU/MCU implementations which include multiple processors 11 (see FIG. 1) to utilize a single auxiliary port (e.g. terminals 30 and 31, see FIG. 2), depending upon the transfer bandwidth requirement for the vendor's application. The auxiliary port 30, 31 may be designated for a single processor 11 on the embedded device during runtime or shared by multiple processors 11 on the embedded device during runtime.

Transfer Codes (TCODE)

In one embodiment of the present invention, the auxiliary pins 31 allow for flexible transfer operations via Public TCODEs and Vendor-Defined TCODEs. TCODEs or Transfer Codes are similar to instruction OPCODEs in that they allow for various formats and operations. The TCODE number identifies the transfer format or the number and/or size of packets to be transferred, and the transfer operation or the purpose of each packet.

In one embodiment of the present invention, Public TCODEs are defined for the auxiliary pins 31 and must be used for designated functions. Public TCODEs are specified pin protocols for accomplishing common visibility and controllability requirements when needed for a vendor application. Vendor-Defined TCODEs are also allowed for vendor-specific transfer operations.

The header containing the TCODE number is always transferred out first and subsequent fields of information are defined for each Public TCODE. The fields of information subsequent to the TCODE header may be variable or fixed length and are defined for each Public TCODE. Some fields may be defined as variable length to maximize transfer throughput.

For one embodiment of the present invention, the minimum TCODE number header size that may be implemented is 4 bits, for encoding the initial 10 Public TCODEs. The TCODE number header size may be expanded for Vendor-Defined TCODES, and may be a different number of bits for alternate embodiments of the present invention.

FIG. 5 lists the Public and reserved TCODEs for one embodiment of the present invention. Only Public TCODEs required by a vendor for a specific MCU/MPU application need to be implemented. For one embodiment of the present invention, Public TCODEs implemented for vendor applications use the identical TCODE number as illustrated in FIG. 5.

FIG. 6 lists additional information on each packet for one embodiment of the Public TCODEs. In FIG. 6, the transfer order of packets for each Public TCODE is listed in descending order. Additionally, the least significant bit for each packet is transferred out first via the auxiliary pins 31 (see FIG. 2).

The packet type is either fixed or variable length. The exact length of fixed length packets may be Vendor-Defined. In one embodiments of the present invention, the exact length of variable length packets is determined during runtime and may be signaled by the TTSE pin(s) 51 (see FIG. 3).

Figure 7:
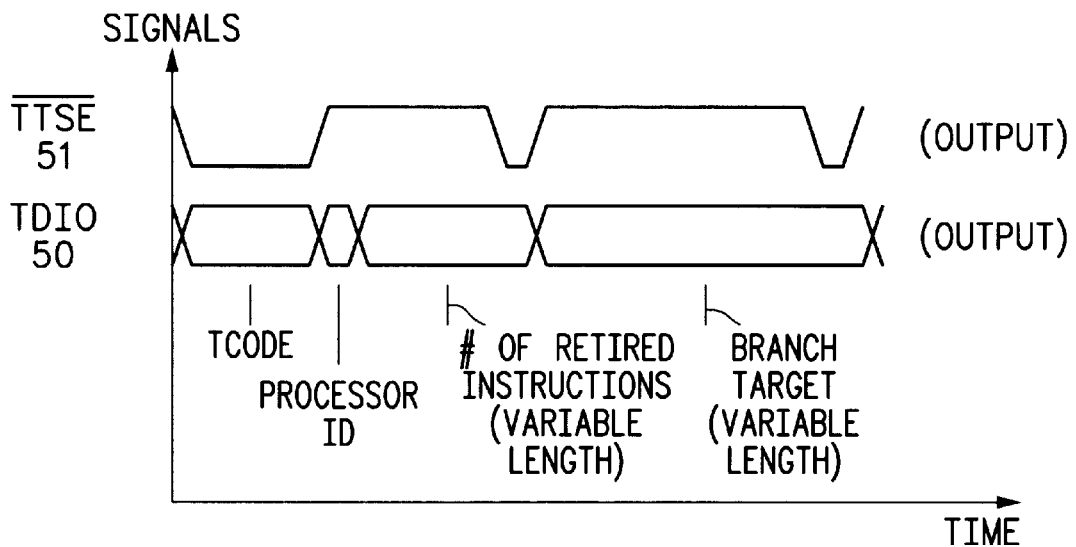
FIG. 7 illustrates, in timing diagram form, a transfer protocol for the indirect branch messaging Public TCODE in accordance with one embodiment of the present invention.

FIG. 7 illustrates the transfer protocol for the indirect branch Public TCODE for one embodiment of the present invention. For purposes of illustration, only one TDIO pin 50 and one TTSE pin 51 (see FIG. 3) are considered to be implemented. Note that for simplicity the TCKO pin 53 (or equivalent MCU/MPU clock pin) is not shown.

The timing diagram illustrated in FIG. 7 describes the TTSE pin 51 function for one embodiment of the present invention. In this embodiment, the TTSE pin 51 includes the following:

1 A 1 followed by two (or more) 0's indicates that a TCODE is being transferred

2 A 0 followed by a 1 indicates the last bit of a variable length transfer

Figure 8:
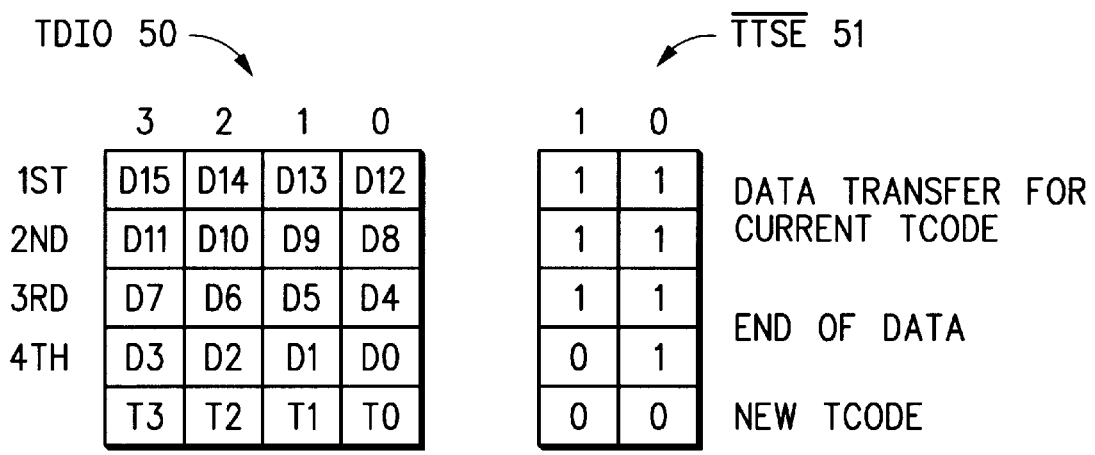
FIG. 8 illustrates, in tabular form, an example of a last portion of a variable length data transfer sequence and the start of another transfer operation in accordance with one embodiment of the present invention.

The variable port size for TDIO pin(s) 50 and TTSE pin(s) 51 allows for increased transfer rates per clock. FIG. 8 illustrates, for a 4-pin TDIO implementation (with 2 TTSE pins), the last portion of a variable length data transfer sequence and the TCODE of another transfer operation. Note that D15 and T3 are considered to be the least significant bit. Alternate embodiments of the present invention may use any number of TDIO pin(s) 50 and TTSE pin(s) 51.

Access to Configuration and Status

FIG. 9 illustrates one embodiment of a portion of development registers 39 of FIG. 2. In one embodiment, FIG. 9 includes register space for registers 60–65, 67–70, and 74. FIG. 9 also includes reserved register space for registers 62, 66, and 71–73. In one embodiment, development registers 39 include JTAG registers 60, the required JTAG IR sequences ($10-$13) for fast configuration and status 61, recommended JTAG IR sequences ($28-$2F) for fast configuration and status 63, and recommended JTAG IR and DR sequences ($30-$3F) for standard development registers 64, 65, 67, and 68 containing configuration and status of other embedded MCU/MPU development features and operations.

If the embedded device has a second processor 11 (see FIG. 1), then both processors may have a set of development registers 39. The second processor 11 would have duplicate registers 64–69 ($30-4F) which would be located at $50-6F. The present invention can also support additional processors 11 (see FIG. 1) as required by vendors.

For some embodiments of the present invention, Vendor-Defined register space 73 is also provided so that Vendor-Defined development functions may be implemented. In many implementations the Vendor-Defined registers 73 will include the transfer registers for interfacing with at least one core processor 11 (e.g. the Program Counter Register, Processor Status Register, etc. within the core processor 11).

Figure 10:
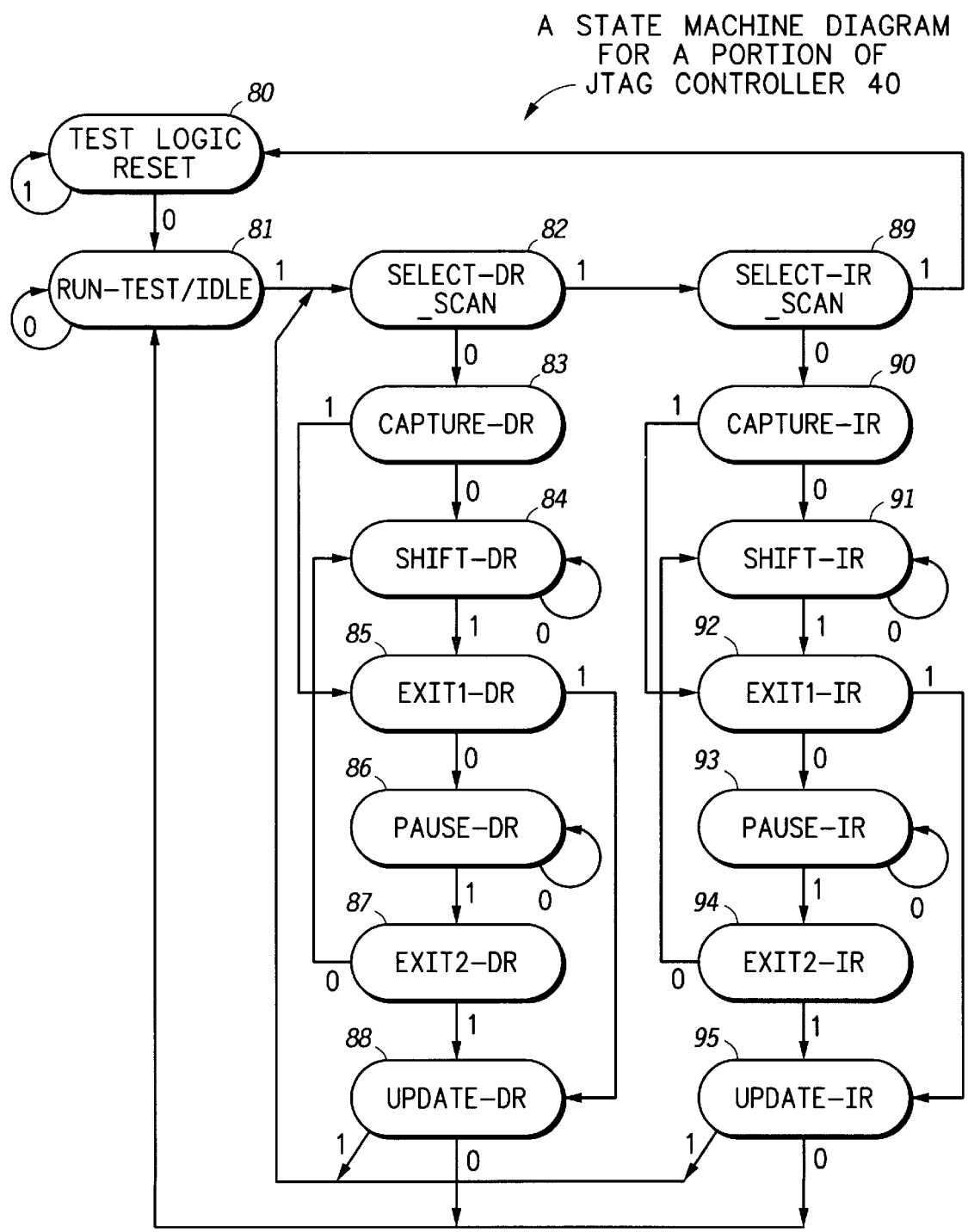
FIG. 10 illustrates, in state diagram form, a state flow for a portion of JTAG controller 40 of FIG. 2 in accordance with one embodiment of the present invention.

For some embodiments of the present invention, all standardized development control registers are reset by JTAG Test Logic Reset state or TRST 80 (see FIG. 10).

In one embodiment of the present invention, the development registers 39 are accessible via the standard JTAG state machine (a portion of JTAG controller 40 of FIG. 2) with a minimum 6-bit Instruction Register implemented to select JTAG 74 or development registers 60–73.

FIG. 10 illustrates the operation of one embodiment of a JTAG state machine within JTAG controller 40 (see FIG. 2). In one embodiment, the JTAG state machine within JTAG controller 40 includes states 80–95. The value shown adjacent to each arc or state transition in FIG. 10 represents the value of the TMS signal sampled on the rising edge of the TCK signal. To access a register 39 anywhere in data processor 10, the following sequence may be used for the illustrated embodiment of the present invention:

1. Enable "Select-IR_Scan" flow 89 and load the Instruction Address Register with address of the desired register.
2. Enable "Select-DR_Scan" flow 82 to access the desired register.

For #1 at the first 2 clocks in the "Shift-IR" state 91, the 2-bit JTAG preamble (1 followed by 0) is shifted in on a TDI pin 50. At the same instant the two bits shifted out on a TDO pin 50 contain the status as follows:

A 0 on the first bit indicates that the processor is halted. A 1 indicates that the processor is not halted.

A 0 on the second bit indicates that the read/write access request has completed. A 1 on the second bit indicates that it has not completed.

Alternate embodiments of the present invention may use other approaches to access registers within data processor 10.

Required Fast Configuration and Status

For one embodiment of the present invention, FIG. 11 illustrates configuration options for the required JTAG IR sequences. Alternate embodiments of the present invention may use a different set of required JTAG IR sequences, or may not include any JTAG IR sequences that are required.

Recommended Fast Configuration and Status

For one embodiment of the present invention, FIG. 12 illustrates configuration options for the recommended JTAG IR sequences. Alternate embodiments of the present invention may use a different set of recommended JTAG IR sequences, or may not include any JTAG IR sequences that are recommended.

Standard Development Registers

The registers and features defined in this section may be included in some embodiments of the present invention. Additionally, only the specific register bits defined in this section which are needed for the vendor's application may be implemented. If defined register bits are not needed for the vendor's application they may be designated as reserved. Alternate embodiments of the present invention may define and utilize fewer, more, or register bits other than those illustrated.

For many of the registers defined in this section there are bits reserved as Vendor-Defined. Thus vendor-specific development features and operations may be included in designated bits of the standard development registers 39 (see FIG. 2 and FIG. 9). Alternate embodiments of the present invention may use a wide variety of individual registers and bit fields for implementing development registers 39.

Development Control Register (DCR) 64

Figure 13:
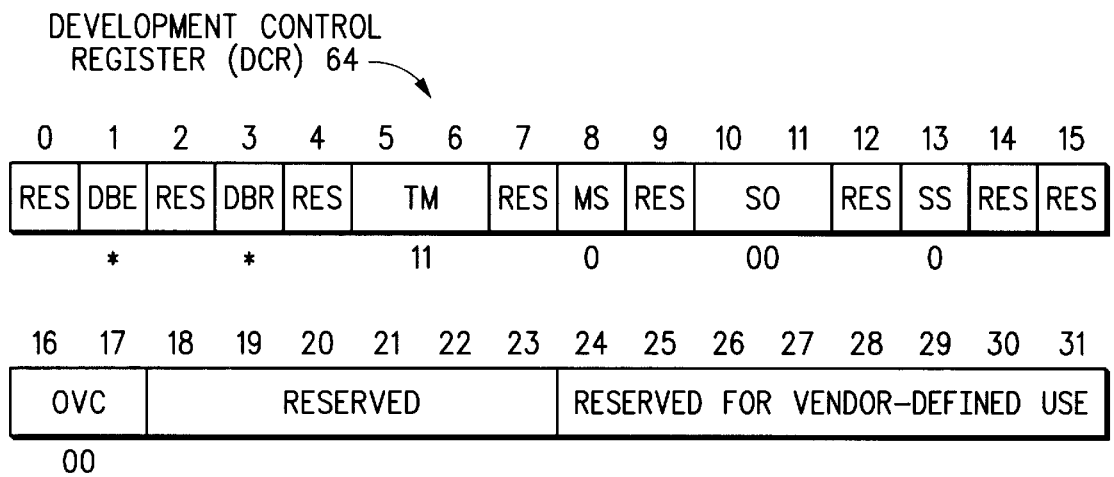
FIG. 13 illustrates, in block diagram form, the development control register (DCR) 64 of FIG. 9 in accordance with one embodiment of the present invention.

FIG. 13 illustrates one embodiment of the Development Control Register (DCR) 64. In one embodiment of the present invention, the DCR register 64 is used for basic development configuration of the MCU/MPU (i.e. data processor 10). The DBE bit enables debug mode and the DBR bit allows for a software mechanism to enter debug mode. If debug mode is enabled then asserting DBR, power-on reset or an exception may cause the data processor 10 to halt and enter debug mode. Enabling debug mode is necessary to use features such as single stepping and breakpoints.

The TM bit field enables BTM and/or DWM.

The MS and SS bit fields determine how the data processor 10 will operate when the DBR bit is negated. If MS=SS=0, then normal operation will commence when the DBR bit is negated. If MS=0 and SS=1, then a single step will occur when the DBR bit is negated with internal memory access. If MS=1 and SS=0, then operation will commence when the DBR bit is negated with instruction/data access via the auxiliary port 31. If MS=SS=1, then a single step will occur when the DBR bit is negated with instruction/data access via the auxiliary port 31.

When MS=1, the state of the SO bit determines if both instructions and data, instructions only, or data only are accessed via the auxiliary pins 31. If an operand is not enabled for memory substitution then it is accessed from internal memory 15.

The OFC bit is used to determine control for overrun of BTM and DWM. Overruns can be handled by displaying an Overrun Message to development tools, delaying the data processor 10 to avoid BTM overruns, delaying the data processor 10 to avoid DWM overruns, or delaying the data processor 10 to avoid both BTM and DWM overruns.

Development Status Register (DSR) 65

Figure 14:
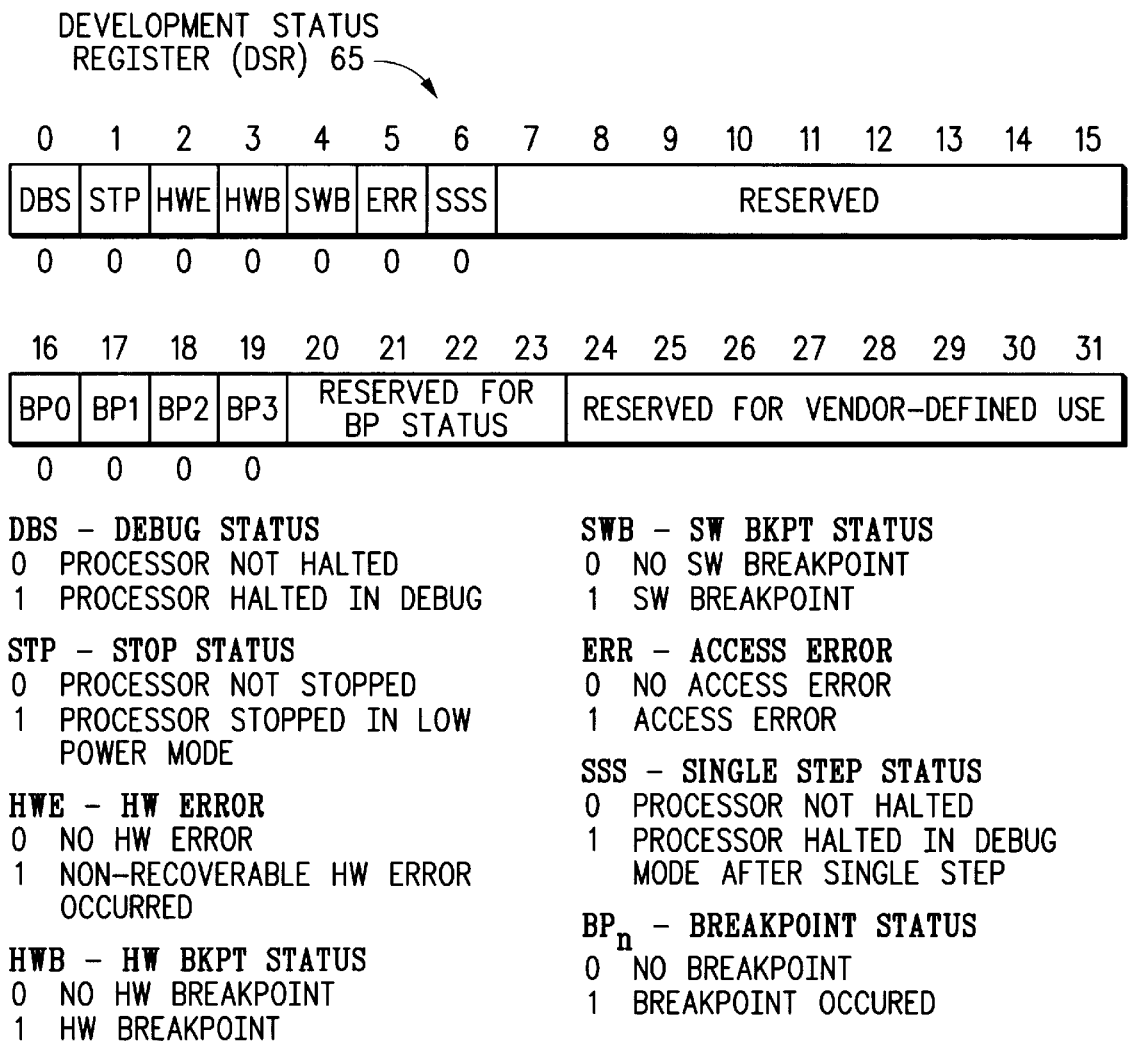
FIG. 14 illustrates, in block diagram form, the development status register (DSR) 65 of FIG. 9 in accordance with one embodiment of the present invention.

FIG. 14 illustrates one embodiment of the Development Status Register (DSR) 65. When debug mode is entered the condition is detected by reading the DBS bit in the DSR register 65, by the JTAG preamble status as described above in the section entitled "Access to Configuration and Status", or by observing the Debug Status TCODE on the auxiliary pins 31. The SSS bit will also be set if debug mode is entered after a single step. The HWB bits and the SWB bit also indicate if a hardware breakpoint (e.g. address comparator) or a software breakpoint (e.g. breakpoint instruction) caused the data processor 10 to halt and enter debug mode. The BPn bits indicate which breakpoint occurred.

Other conditions which may impact development support are detecting when the data processor 10 is in a Low Power mode or a non-recoverable hardware error has occurred. The STP bit and the HWE bit may be implemented to indicate these conditions.

Figure 15:
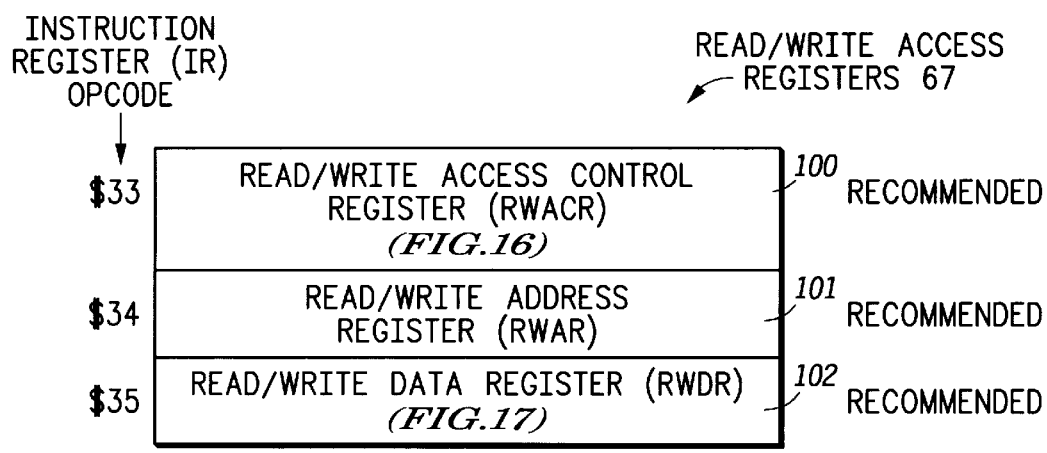
FIG. 15 illustrates, in block diagram form, the read/write access registers 67 of FIG. 9 in accordance with one embodiment of the present invention.
Figure 16:
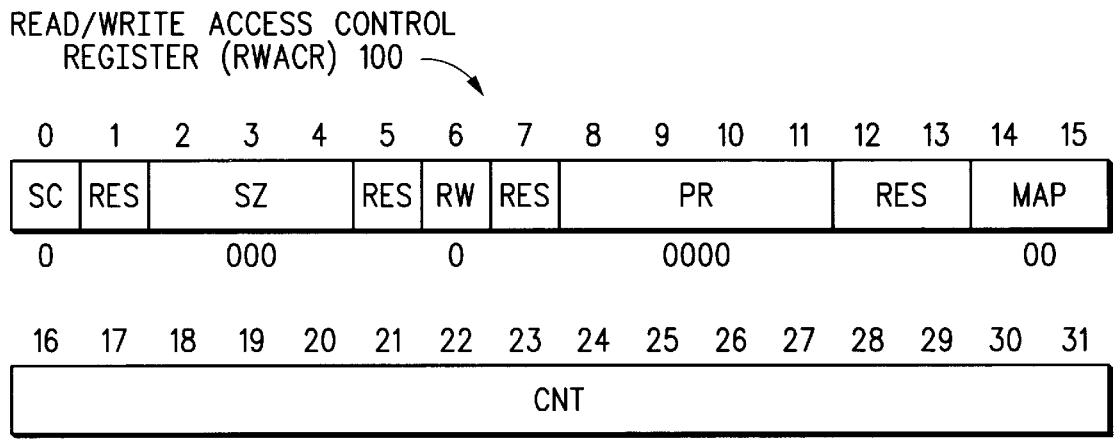
FIG. 16 illustrates, in block diagram form, the read/write access control register (RWACR) 100 of FIG. 15 in accordance with one embodiment of the present invention.

The ERR bit provides error status of an access via the Read/Write Access registers 67 (see FIG. 15).

All status bits are cleared by reading the DSR register 65.

Read/Write Access Registers

FIG. 14 illustrates one embodiment of the Read/Write Access Registers 67 of FIG. 9. In one embodiment of the present invention, the Read/Write Access registers 67 provide DMA-like access to internal memory-mapped resources during runtime. Alternate embodiments of the present invention may have fewer, more, different, or no Read/Write Access Registers 67.

Read/Write Access Control Register (RWACR)

FIG. 14 illustrates one embodiment of the Read/Write Access Control Register 100 of FIG. 15. In one embodiment of the present invention, the RWACR register 100 is used for read/write access configuration. The SZ, RW, PR and CNT bit fields are written to the desired settings and the SC bit is asserted during a single JTAG IR and DR sequence to initiate an access to internal memory-mapped resources during runtime. The ERR bit field in DSR (or in RWDR) can be read to determine if an error occurred during the access.

The PR bits are intended to allow for implementations which perform a variety of access priorities, from a lowest-intrusive access (0b0000) to a highest-intrusive access (0b1111). The exact meaning of the encodings may be Vendor-Defined.

The MAP bits are intended to allow for multiple memory maps to be accessed. The primary processor memory map may be designated as the default (MAP=00). Secondary memory maps, such as special-purpose processor memory maps, which are implemented in some processor architectures may also require access.

Read/Write Address Register (RWAR)

FIG. 15 illustrates one embodiment of the Read/Write Address Register 101. In one embodiment of the present invention, the RWAR register 101 is used to identify the address of internal memory-mapped resources to be accessed, or the lowest address (i.e. lowest unsigned value) for a block move (CNT>0). The register size of RWAR may be fixed or may be defined by the vendor.

Read/Write Data Register (RWDR)

Figure 17:
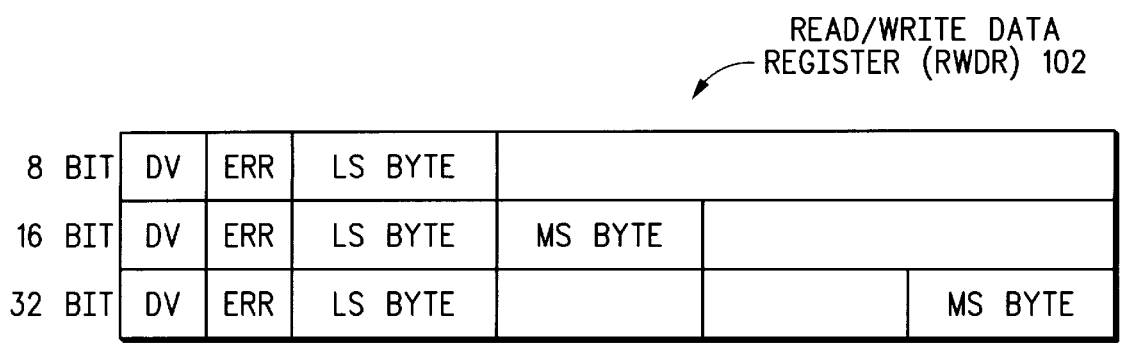
FIG. 17 illustrates, in block diagram form, the read/write data register (RWDR) 102 of FIG. 15 in accordance with one embodiment of the present invention.

FIG. 17 illustrates one embodiment of the Read/Write Data Register 102 of FIG. 15. In one embodiment of the present invention, the RWDR is used to contain the data to be written for a write access and the read data for a read access. The register size of RWDR is defined by the vendor.

For read accesses the register will contain 3 types of information: read data, the data valid (DV) bit and the ERR bit as described in DSR. The figure below shows the organization of the information for 3 different example access sizes. The least significant bit may be fixed or may be defined by the vendor.

For a read access if DV=1 and ERR=0 the read access has completed and no access error occurred. If DV=0 and ERR=0 then the read access has not completed. If DV=0 and ERR=1 then an access error has occurred. The condition DV=1 and ERR=1 is not allowed in the illustrated embodiment of the present invention.

Breakpoint Registers

Figure 18:
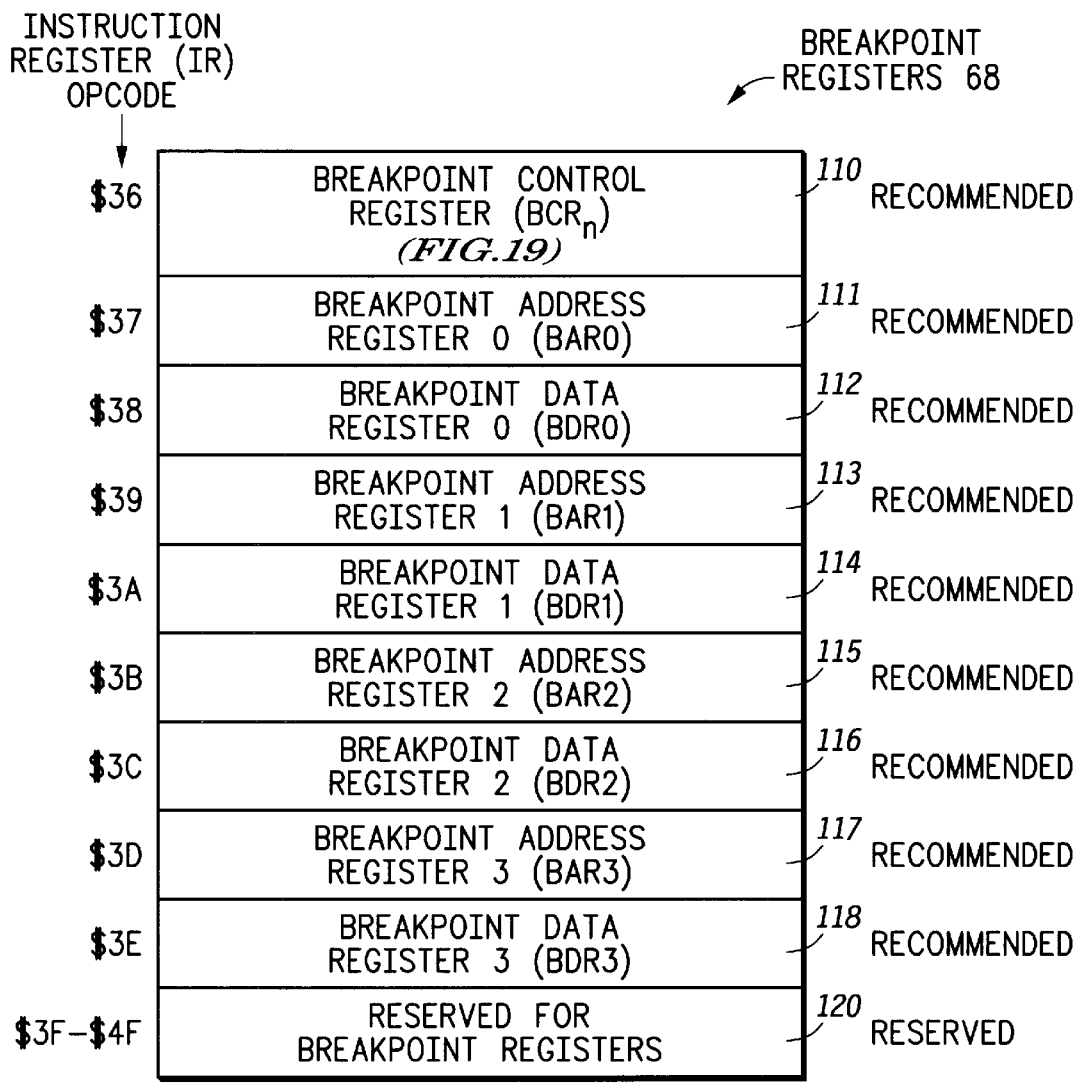
FIG. 18 illustrates, in block diagram form, breakpoint registers 68 of FIG. 9 in accordance with one embodiment of the present invention.

FIG. 18 illustrates one embodiment of the Breakpoint Registers 68 of FIG. 9. The Breakpoint registers 68 may be used to provide configuration for MCU/MPU breakpoint logic.

For some embodiments of the present invention, the Breakpoint registers 68 may be accessible both via the JTAG pins 30 and via the data processor's user model (see register map illustrated in FIG. 9).

Breakpoint Control Register (BCR)

Figure 19:
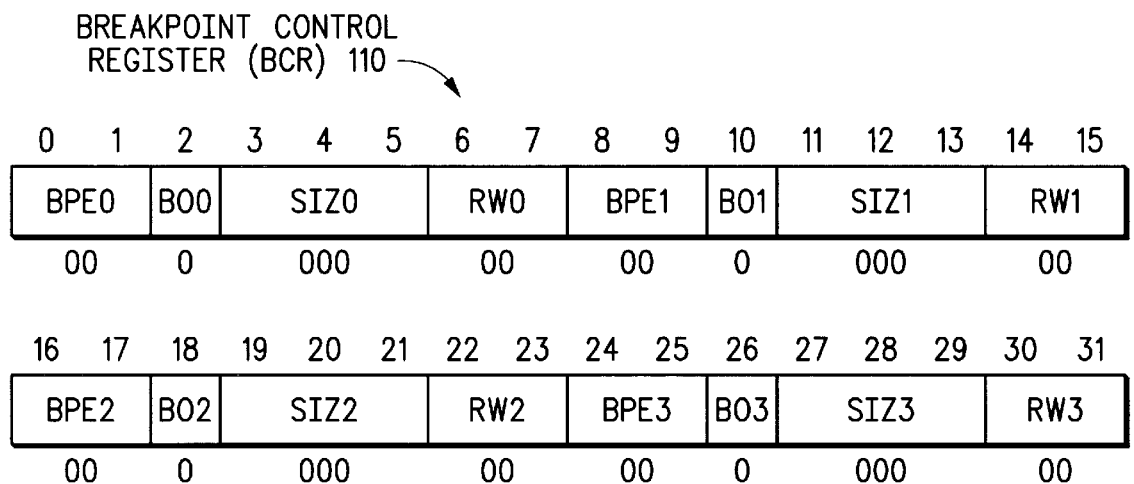
FIG. 19 illustrates, in block diagram form, a breakpoint control register (BCR) 110 of FIG. 18 in accordance with one embodiment of the present invention.

FIG. 19 illustrates one embodiment of the Breakpoint Control Register 110 of FIG. 18. In one embodiment of the present invention, the BCR register 110 provides control for breakpoint logic. The BPEx bits enable the following: normal breakpoints, watchpoints for memory substitution and watchpoints (data processor 10 not halted). Other breakpoint control options may be programmed in the OPx, SIZx and RWx bit fields.

If logical conditions of breakpoint detection are needed, or if counting N breakpoints is needed for development, then Vendor-Defined control registers can be defined to provide these or other breakpoint features.

Breakpoint Address Register (BAR)

FIG. 18 illustrates one embodiment of the Breakpoint Address Registers 111, 113, 115, and 117. In one embodiment of the present invention, The BAR registers are used to compare against addresses (instruction or data). The register size of the BAR register may be defined by the vendor.

Breakpoint Data Register (BDR)

FIG. 18 illustrates one embodiment of the Breakpoint Data Registers 112, 114, 116, and 118. In one embodiment of the present invention, The BDR registers are used to compare against data values. The register size of the BDR register may be defined by the vendor.

If only instruction breakpoints are required for development, the BDR registers 112, 114, 116, and 118 need not be implemented.

Timing Diagrams

The following discussion provides some examples and sample timing for selected embodiments of the present invention. Alternate embodiments of the present invention may use different pin/signal configurations and different signal timings than those illustrated.

Figure 20:
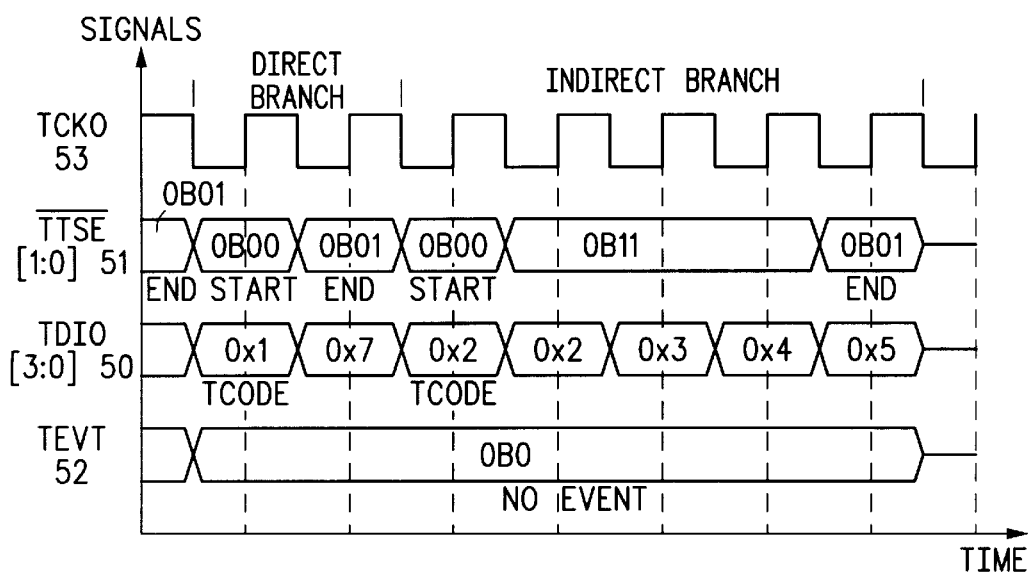
FIG. 20 illustrates, in timing diagram form, an example of direct and indirect branch TCODEs in accordance with one embodiment of the present invention.

Direct and Indirect Branch TCODEs with 2-bit TTSE Signals 51 and 4-bit TDIO Signals 50 (see FIG. 20)

FIG. 20 illustrates an example of one possible timing of direct and indirect branch TCODE transfers for one embodiment of the present invention. Alternate embodiments of the present invention may use different timing.

Example Packet Values

Direct branch TCODE=1

Indirect branch TCODE=0

Source Processor=0

Number of instructions executed since last taken branch=7

Number of instructions executed between direct and indirect branch=1

Unique portion of Indirect branch address=0x543

Explanation

TDIO[3:0] transfers are LSB first for each packet so the actual binary bit sequence is
1. direct branch=TCODE+Source Processor+# of Seq. Inst
=1000+0+111
2. indirect branch=TCODE+Source Processor+# of Seq. Inst+Addr
=0100+0+100+1100 0010 1010

Figure 21:
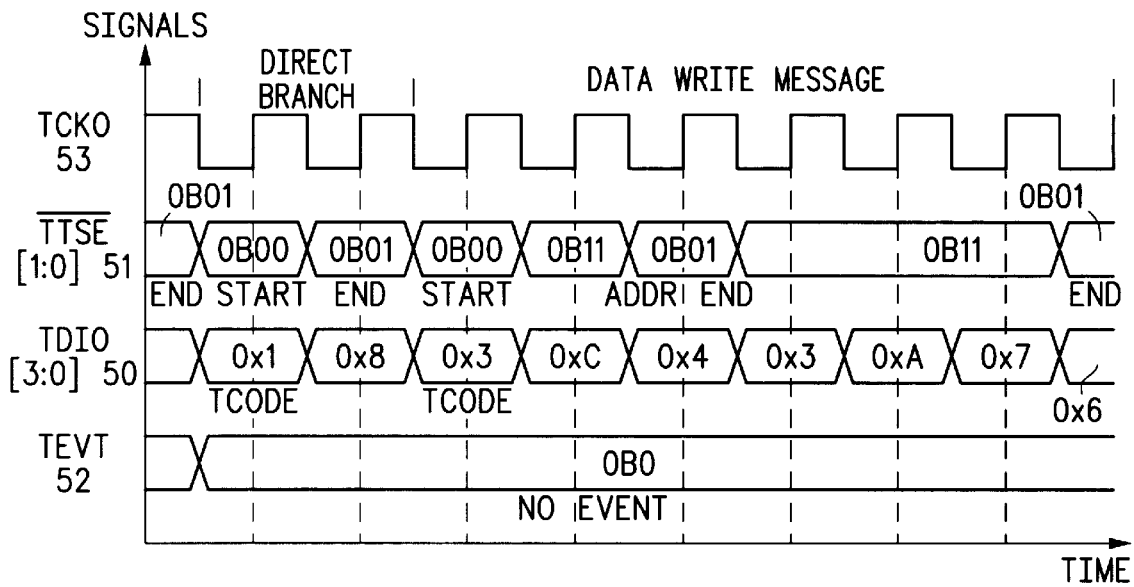
FIG. 21 illustrates, in timing diagram form, an example of direct branch and data write TCODEs in accordance with one embodiment of the present invention.

Direct Branch and Data Write TCODEs with 2-bit TTSE Signals 51 and 4-bit TDIO Signals 50 (see FIG. 21)

FIG. 21 illustrates an example of one possible timing of direct branch and data write TCODE transfers for one embodiment of the present invention. Alternate embodiments of the present invention may use different timing.

Example Packet Values

Direct branch TCODE=1

Data Write TCODE=3

Source Processor=0

Number of instructions executed since last taken branch=4

Unique portion of data write address=0x4C 16-bit data write value=0x67A3

Explanation

TDIO[3:0] transfers are LSB first for each packet so the actual binary bit sequence is
direct branch=TCODE+Source Processor+# of Seq. Inst
=1000+0+001
data write=TCODE+Address+Data
=1100+0011 0010+1100 0101 1110 0110

Figure 22:
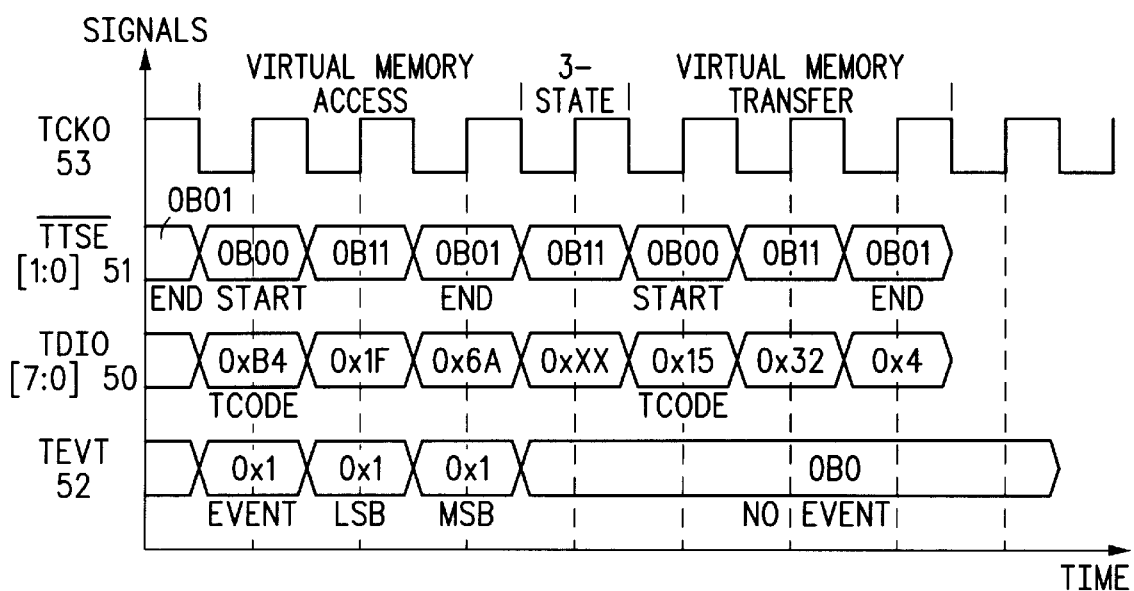
FIG. 22 illustrates, in timing diagram form, breakpoint to memory substitution in accordance with one embodiment of the present invention.

Watchpoint to Memory Substitution with 2-bit TTSE Signals 51 and 8-bit TDIO Signals 50 (see FIG. 22)

FIG. 22 illustrates an example of one possible timing of watchpoint to memory substitution TCODE transfers for one embodiment of the present invention. Alternate embodiments of the present invention may use different timing.

Example Packet Values

Virtual Memory Access TCODE=4

Virtual Memory Transfer TCODE=5

Event number 2

Instruction/data=1 (data)

Size=0b01 (16 bit)

Unique portion of target address=1xD43F 8-bit memory substitution data=0x4321

Only 1 clock for TDIO direction change for virtual memory transfer

Explanation

TDIO[7:0] transfers are LSB first for each packet so the actual binary bit sequence is
Virtual Memory Access=TCODE+Inst/Data+Size+Address
=0010+1+10+11111 1000 0101 011
Virtual Memory Transfer=TCODE+Data
=0101+1000 0100 1100 0010

Electrical Specifications

FIG. 23 illustrates, in timing diagram form, an example of electrical specifications for the READI auxiliary signals 31 of FIG. 1 in accordance with one embodiment of the present invention. FIG. 24 illustrates, in tabular diagram form, a relationship between electrical specifications and clock frequency for the READI auxiliary signals 31 of FIG. 1 in accordance with one embodiment of the present invention. Alternate embodiments of the present invention may use different timing and different electrical specifications. Note that the specifications are defined as relative to clock frequency. Development tools may be rated for the maximum frequency 1/P that can be supported.

Selected Applications of the Present Invention

In some embodiments of the present invention, BTM, DWM and calibration constant tuning can be provided via a minimal pin interface (JTAG pins 30 and auxiliary pins 31). The following text and figures describe examples and calculations based on characteristics of an application of the present invention for automotive control software and development processes.

Transfer Rate

The transfer rate via the auxiliary pins 31 is dependent upon several factors:

Clock rate of transfer

Number of TDIO pins 50 (see FIG. 3)

Efficiency of transfer protocol

For the remainder of this section an example clock rate for transfers is assumed to be 40 Mhz. (Although the clock rate is variable and can be any frequency) and the two other transfer rate factors are examined. Of course, alternate embodiments of the present invention may use any frequency clock (TCKO 53) for transfers.

Branch Trace Messaging (BTM)

FIG. 25 illustrates the average transfer rate for direct and indirect branches based on the following assumptions:

Direct Branch and Indirect Branch TCODEs are used 4 bits for TCODE is assumed for all options Average branch displacement of 16 bits for indirect branches Average number of sequential instructions executed between taken branches is in the 4-bit range Average Direct Branch transfer operation=4+1+4=9 bits Average Indirect Branch transfer operation=4+1+4+16= 25 bits Note that FIG. 25 lists the average branches per second and it is assumed that an internal queue size is implemented which accommodates the peak occurrence of branches.

Example #1

For this example assume that taken branches (both direct and indirect) include 15% of instructions executed. Furthermore assume taken direct branches include 12.5% of instructions executed and taken indirect branches include 2.5% of instructions executed. Assuming that instructions execute every 1.5 clocks or at a 26.67 Mhz rate, then direct branches taken occur at a 12.5%×26.67 Mhz or 3.33 Mhz rate and indirect branches taken occur at a 2.5%×26.67 Mhz or 0.67 Mhz rate. Thus for this example option B (2-bit TDIO signals 50) may be sufficient.

Data Write Messaging (DWM)

FIG. 26 illustrates the transfer rate for data writes based on the following assumptions:

Data Write Messaging TCODE is used 4 bits for TCODE is assumed for all options 16-bit or 32-bit data Write address range is assumed to be 16 bits–64K bytes Unique portion of the data write address is assumed to be 16 bits (worst case and would probably not occur)

Average 32-bit transfer operation=4+16+32=52 bits

Average 16-bit transfer operation=4+16+16=36 bits

Note that FIG. 26 lists the average writes per second and it is assumed that an internal queue size is implemented which accommodates the peak occurrence of writes.

Example #2

For this example assume that data writes to internal RAM (e.g. RAM within memory 15 of FIG. 1) and peripherals (e.g. other modules 12) include 5% of instructions executed. And if instructions are executed on average each 1.5 clocks then data writes occur every 30 clocks on average. Thus for this example option B (2-bit TDIO signals 50) may be sufficient.

Calibration Constant Tuning

Referring to FIG. 10, a write access using the Read/Write Access registers 67 (see FIG. 9 and FIG. 15) would include the following steps for one embodiment of the present invention:

1. Enable "Select-IR_Scan" 89 flow and load the Instruction Address register with the address of the RWAR register 101 ($34).
2. Enable "Select-DR_Scan" 82 flow to load the RWAR register 101 with the write address.
3. Enable "Select-IR_Scan" 89 flow and load the Instruction Address register with the address of the RWDR register 102 ($35).
4. Enable "Select-DR_Scan" 82 flow to load the RWDR register 102 with the write value.
5. Enable "Select-IR_Scan" 89 flow and load the Instruction Address register with the address of the RWACR register 100 ($33).
6. Enable "Select-DR_Scan" 82 flow to load the RWACR register 100 with the configuration value.
7. If a block write is configured then steps 3 and 4 would be repeated for each data value. The write complete status is observable via the JTAG preamble status (or the RWACR register 100).

A read access using the Read/Write Access registers 67 would include the following steps for one embodiment of the present invention:

1. Enable "Select-IR_Scan" 89 flow and load the Instruction Address register with the address of the RWAR register 101 ($34).
2. Enable "Select-DR_Scan" 82 flow to load the RWAR register 101 with the read address.
3. Enable "Select-IR_Scan" 89 flow and load the Instruction Address register with the address of the RWACR register 100 ($33).
4. Enable "Select-DR_Scan" 82 flow to load the RWACR 100 register with the configuration value.
5. Enable "Select-IR_Scan" 89 flow and load the Instruction Address register with the address of the RWDR register 102 ($35).
6. If the read has been completed (observable via the JTAG preamble status) enable "Select-DR_Scan" 82 flow to read the RWDR 102 register.

If a block read is configured, then steps 5 and 6 would be repeated for each data value.

For 32-bit implementations of RWAR register 101 and RWDR register 102, steps 1, 3 and 5 require approximately 16 TCK clocks 53. States 2, 4 and 6 require approximately 38 TCK clocks 53. Note that for some embodiments of the present invention, the clock rate of TCK 53 may be limited to a slower frequency than the MCU/MPU clock frequency (e.g. ¼ of the MCU/MPU clock frequency).

FIG. 27 lists the basic steps required for calibration constant tuning writes via the Read/Write Access registers 67 for one embodiment of the present invention. The number of clocks required for each step is also listed in the table based on the following assumptions:

24-bit implementations of RWAR register 101 and 32-bit implementation of RWDR register 102

The clock rate of TCK 53 is limited to ¼ of the MCU/MPU clock frequency

FIG. 28 shows the transfer rate for 32 and 16-bit write accesses, and for single and block write accesses, for one embodiment of the present invention. For a single write access steps 1 through 6 are required. For a block write access steps 1 through 6 are required for the first write access, but only steps 3 and 4 are required for each additional write access. For simplicity it is assumed that no wait states are required for the instrumentation performing the write accesses (i.e. MCU/MPU completes each write access request before the next one is requested).

What is claimed is:

1. A data processor development interface comprising:
   development interface circuitry adapted for transmitting and receiving software development data within a data processor;
   at least one bi-directional data input/output (TDIO) terminal coupled to the development interface circuitry for transmitting and receiving the software development data to and from the development interface circuitry, the software development data being communicated serially through the at least one bi-directional data input/output terminal in data packets, the data packets comprising a transfer code portion and a data portion wherein a decoding of the transfer code portion identifies a purpose of the data located in the data portion; and
   at least one control signal (TTSE) associated with the at least one bi-directional data input/output terminal, the at least one control signal indicating when the transfer code portion starts and the data portion ends.

2. The data processor development interface of claim 1 wherein the data packets contain a data field which identifies which processing unit is associated with the data portion.

3. The data processor development interface of claim 1 wherein the data portion is either a fixed length data portion or a variable length data portion depending upon the decoded transfer code portion.

4. The data processor development interface of claim 1 wherein the data portion will contain program flow change information provided in response to a program flow change within the data processor.

5. The data processor development interface of claim 1 wherein the data portion will contain a data value that was written to an internal resource within the data processor containing the data processor development interface.

6. The data processor development interface of claim 1 wherein a code of binary 100 over the at least one control signal (TTSE) indicates a start of the first type of data.

7. The data processor development interface of claim 1 wherein a code of binary 01 over the at least one control signal (TTSE) indicates an end of the second type of data.

8. The data processor development interface of claim 1 further comprising:
   a development interface clock (TCKO) terminal coupled to the development interface circuitry to provide a development interface clock signal that allows for synchronization of input and output operations to and from the development interface circuitry.

9. The data processor development interface of claim 8 wherein the development interface circuitry is integrated into a microcontroller integrated circuit, the development interface clock signal operating at frequency that is different from a frequency of a clock operating the microcontroller integrated circuit.

10. The data processor development interface of claim 1 further comprising:
    an event signal terminal (TEVT) coupled to the development interface circuitry for providing an event signal, the event signal indicating when a breakpoint or watchpoint occurs in a software execution flow within a data processor coupled to the data processor development interface.

11. The data processor development interface of claim 1 wherein the development interface circuitry is embedded into a larger integrated circuit that comprises one or more processing units coupled to the development interface circuitry and an internal memory coupled to the one or more processing units.

12. The data processor development interface of claim 1 wherein the development interface circuitry is embedded into an integrated circuit containing at least one processing unit, where the development interface circuitry provides data packets external to the integrated circuit without a need to stall the at least one processing unit.

13. A data processor development interface comprising:
    development interface circuitry adapted for transmitting and receiving software development data within a data processor;
    at least one bi-directional data input/output (TDIO) terminal coupled to the development interface circuitry for transmitting and receiving the software development data to and from the development interface circuitry, the software development data being of either a first type of data or a second type of data; and
    at least one control signal (TTSE) associated with the at least one bi-directional data input/output terminal, the at least one control signal indicating when the first type of data starts and the second type of data ends, wherein the development interface circuitry is embedded into an integrated circuit in parallel with a JTAG test circuit also embedded within the integrated circuit.

14. A data processor embodied in an integrated circuit and having a development interface, the data processor comprising:
    at least one processing unit; and
    the development interface coupled to the at least one processing unit via a bus, the development interface selectively communicating data processor software execution tracking information external to the integrated circuit in a packet format, the packet format comprising an instruction field (TCODE) and a data field, the packet format containing an instruction in the instruction field that, when decoded, indicates a predetermined operating condition within the data processor.

15. The data processor of claim 14 wherein the development interface communicates the data processor software execution tracking information in the packet format in serial groups of bits, the serial groups of bits being communicated through bi-directional data input/output (TDIO) terminals coupled to outputs of the development interface, wherein a beginning and ending of the packet format is identified by signals provided on at least one control signal (TTSE) terminal coupled to an output of the development interface and provided external to the integrated circuit.

16. The data processor of claim 14 wherein a development interface clock (TCKO) terminal is coupled to the development interface to provide a development interface clock signal that allows for synchronization of the data processor software execution tracking information external to the integrated circuit.

17. The data processor of claim 14 wherein an event signal terminal (TEVT) is coupled to the development interface to provide an event signal, the event signal indicating when a breakpoint or watchpoint occurs in a software execution flow in the data processor.

18. The data processor of claim 14 wherein the packet format contains a processor identification field which associates one of the at least one processing units with the instruction field and data field in the packet format.

19. The data processor of claim 16 wherein the instruction in the instruction field, when decoded, indicates that at least one processing unit in the data processor is in a halted operational state.

20. The data processor of claim 16 wherein the instruction in the instruction field, when decoded, indicates that at least one processing unit in the data processor has taken a direct change of program flow during software execution.

21. The data processor of claim 20 wherein the data field of the packet format is a variable length data field that indicates a number of instructions executed without a change of program flow before the direct change of program flow.

22. The data processor of claim 14 wherein the instruction in the instruction field, when decoded, indicates that at least one processing unit in the data processor has taken an indirect change of program flow during software execution.

23. The data processor of claim 22 wherein the data field of the packet format is a variable length data field that indicates: (1) a number of instructions executed without a change of program flow that occurred before the indirect change of program flow; and (2) indicates a change of flow address.

24. The data processor of claim 14 wherein the instruction in the instruction field, when decoded, indicates that at least one processing unit in the data processor has written a data value to a location internal to the data processor.

25. The data processor of claim 24 wherein the data field of the packet format is a variable length data field that indicates: (1) the data value written to the location internal to the data processor; and (2) an address value identifying the location internal to the data processor.

26. The data processor of claim 14 wherein the instruction in the instruction field, when decoded, indicates that at least one processing unit in the data processor has requested a virtual memory access.

27. The data processor of claim 26 wherein the data field of the packet format is a data field that indicates: (1) whether the virtual memory access was for instruction information or data information; (2) a size of a value being accessed by the virtual memory access; and (3) an address value identifying a location accessed by the virtual memory access.

28. The data processor of claim 14 wherein the instruction in the instruction field, when decoded, indicates that at least one processing unit in the data processor is being sent data in response to a virtual memory access.

29. The data processor of claim 28 wherein the data field of the packet format is a variable length data field that contains data being sent to the data processor.

30. The data processor of claim 14 wherein the instruction in the instruction field, when decoded, indicates that a virtual memory access is completing.

31. The data processor of claim 30 wherein the data field of the packet format is a variable length data field that contains a last portion of data being sent to the data processor for the virtual memory access.

32. The data processor of claim 14 wherein the instruction in the instruction field, when decoded, indicates that at least one processing unit in the data processor is transmitting a data message having a number of data elements having data values.

33. The data processor of claim 32 wherein the data field of the packet format is a variable length data field that comprises: (1) the number of data elements being sent in the data message; and (2) the data values that comprise the data message.

34. The data processor of claim 33 wherein the data field of the packet format is a variable length data field that also comprises a field to identify a purpose of the data message.

35. The data processor of claim 14 wherein the instruction in the instruction field, when decoded, indicates that at least one processing unit in the data processor has experienced an overrun.

36. The data processor of claim 35 wherein the data field of the packet format is at least one bit that indicates whether the overrun is a data overrun or a program overrun.

37. The data processor of claim 14 wherein the instruction in the instruction field, when decoded, indicates that at least one processing unit in the data processor is to perform a trace synchronization operation.

38. The data processor of claim 37 wherein the data field of the packet format is at variable length field that indicates a recent instruction address for an instruction recently executed by the data processor.

39. A data processing system embedded within an integrated circuit, the data processing system comprising:
at least one processing unit;
internal memory locations coupled to the at least one processing unit by at least one communication bus; and
a development interface coupled to the at least one processing unit, the development interface communicating packets of information through external terminals of the integrated circuit, the packets containing header information and optional data information, the packets allowing the development interface to:
(1) trace program execution flow within the at least one processing unit;
(2) externally reproduce, external to the integrated circuit, stored values within at least a portion of the internal memory locations; and
(3) substitute access of program and/or data stored internal to the integrated circuit with an access of program and/or data stored external to the integrated circuit.

40. The data processing system of claim 39 wherein the packets also allow the development interface to generate breakpoints and/or watchpoints during execution of software by the at least one processing unit.

41. The data processing system of claim 39 wherein the header information contain opcodes that are either fixed in function or user-defined in function.

42. The data processing system of claim 39 further comprising:
at least one bi-directional data input/output (TDIO) terminal coupled to the development interface for transmitting packets from the development interface to an external device; and
at least one control signal (TTSE) associated with the at least one bi-directional data input/output terminal, the at least one control signal indicating a start of transmission and an end of transmission of a packet.

43. The data processing system of claim 39 further comprising:
a clock signal (TCKO) being output from the development interface for receipt by a device external to the integrated circuit, the clock signal allowing the packets of information to be externally processed.

44. The data processing system of claim 39 further comprising:
an event signal (TEVT) being output from the development interface for receipt by a device external to the integrated circuit, the event signal indicating when a breakpoint or watchpoint occurs in a software execution flow within the data processing system.

45. The data processing system of claim 39 wherein at least one packet contains a code which indicates that a portion of the data processing system has been placed into a halted state.

46. The data processing system of claim 39 wherein at least one packet contains a code which either: (1) indicates that the data processing system has taken an indirect change of program flow; or (2) indicates that the data processing system has taken a direct change of program flow.

47. The data processing system of claim 39 wherein at least one packet contains a code which either: (1) indicates that the data processing system is initiating an operation to read a computer value from memory external to the integrated circuit in lieu of a computer value stored in internal memory within the integrated circuit; (2) indicates that the data processing system is receiving the computer value from memory external to the integrated circuit in lieu of the computer value stored in internal memory within the integrated circuit; or (3) indicates that the data processing system should cease receiving computer values from memory external to the integrated circuit in lieu of the computer values stored in internal memory within the integrated circuit.

48. The data processing system of claim 39 wherein at least one packet contains a code which indicates that a synchronization operation should occur external to the data processing system.

49. The data processing system of claim 39 wherein at least one packet contains a code which indicates that a first-in-first-out (FIFO) buffer, located within the development interface and used to supply information within the packets, has experienced overflow.

50. The data processing system of claim 39 wherein a JTAG circuit is located within the integrated circuit and parallel to the development interface, the JTAG circuit being coupled to external terminals of the integrated circuit to enable read and write operations to internal memory locations within the integrated circuit.

51. A data processing system on an integrated circuit, the data processing system comprising:
at least one processing unit coupled to an internal memory on the integrated circuit;
a bus interface unit coupled to the at least one processing unit to enable the at least one processing unit to access external memory;
a development interface coupled to the at least one processing unit, the development interface being used to transmit packetized information external to the integrated circuit, the packetized information having a control code field for decoding and a data field for providing data, the packetized information being adapted to allow a device external to the integrated circuit to monitor program execution flow and internal data write operations to the internal memory by processing the packetized information; and
a JTAG circuit coupled to the at least one processing unit, the JTAG circuit being adapted to allow a device external to the integrated circuit to read and write memory locations within the integrated circuit.

52. A method for providing information external to an integrated circuit, the method comprising the steps of:
receiving information related to a change in program flow from a processing unit internal to the integrated circuit, and placing this information into an available entry of a first queue;
receiving information related to a write operation performed to a memory location within the integrated circuit, and placing this information into an available entry of a second queue;
removing information, in a prioritized manner, from an entry in one of the first and second queue to create selected information;

adding a header to the selected information to form a packet of information; and
serially communicating the packet through external terminals of the integrated circuit.

53. The method of claim 52 wherein the first and second queues are same queue.

54. The method of claim 52 wherein the first and second queues are first-in-first-out (FIFO) buffers.

55. The method of claim 52 wherein the information related to a change in program flow identifies whether the change of program flow was direct or indirect, identifies a number of executed instructions executed since a last change of program flow, and a target address if the change in program flow is indirect.

56. The method of claim 52 wherein the information related to the write operation is a data value written to the memory location and an address value that identifies the memory location.

57. The method of claim 52 wherein the first and second queues store a value that indicate which processor originated the information in a multiple-processing-unit system.

58. A method for processing information external to an integrated circuit, the method comprising the steps of:
receiving serially communicated packet information from external terminals of the integrated circuit;
collecting the serially communicated packet information in a buffer location, a signal from the integrated circuit indicating when transmission of the serially communicated packet information is complete;
removing a header code from the serially communicated packet information and decoding the header code to determine whether data contained within the serially communicated packet information is program flow information or data write information;
presenting the data within the serially communicated packet information as program flow information which tracks changes of execution flow of software executed within the integrated circuit when the step of removing and decoding the header code indicates that the data contained within the serially communicated packet information is program flow information; and
replicating, in external memory external to the integrated circuit, the data contained within the serially communicated packet information when the header code contained within the serially communicated packet information indicates that the data contained with the serially communicated packet information is data write information, the replicating being performed so that a state of internal memory within the integrated circuit can be tracked external to the integrated circuit.

59. A data processing system having a set of registers, the set of registers comprising:
a development interface circuit for communicating test output information from the data processing system in a packet form and for receiving test input information from external to the data processing system in the packet form;
a development control register, internal to the data processing system, for configuring the development interface circuit to perform one of either data write messaging or branch trace messaging; and
a development status register, internal to the data processing system, for indicating a status of the data processing system when being tested via the development interface circuit.

60. The data processing system of claim 59 wherein the set of registers further comprise:
   a JTAG identification (ID) register for identifying a type of the data processing system;
   a JTAG instruction register for receiving test instructions from external to the data processing system;
   a JTAG boundary scan register for transmitting test information to and from the data processing system; and
   a JTAG bypass register for bypassing the data processing system during testing.

61. The data processing system of claim 60 further comprising:
   means for shifting an instruction opcode into the JTAG instruction register, the instruction opcode, when decoded, configuring development interface terminals and development interface circuitry to a predetermined configuration.

62. The data processing system of claim 59 wherein the set of registers further comprise:
   one or more development read/write registers for reading and writing information out of and into registers internal to the data processing system.

63. The data processing system of claim 59 wherein the set of registers further comprise:
   one or more breakpoint registers for configuring breakpoints and watchpoints that trigger based upon one of either instruction addresses, data addresses, or data values communicated within the data processing system.

64. The data processing system of claim 63 further comprising:
   means for allowing a watchpoint to trigger one or more of branch trace messaging, data write messaging, or memory substitution.

65. A data processing system comprising:
   a development interface circuitry for performing data write messaging and branch trace messaging within the data processing system, the development interface circuitry having development interface terminals;
   a JTAG identification (ID) register for identifying a type of the data processing system;
   a JTAG instruction register for receiving test instructions from external to the data processing system;
   a JTAG boundary scan register for transmitting test information to and from the data processing system;
   a JTAG bypass register for bypassing the data processing system during testing; and
   means for shifting instruction opcodes into the JTAG instruction register, the instruction opcodes, when decoded, configuring the development interface terminals and development interface circuitry to a predetermined configuration to perform one of either the data write messaging or the branch trace messaging.

* * * * *

UNITED STATES PATENT AND TRADEMARK OFFICE
CERTIFICATE OF CORRECTION

PATENT NO. : 6,145,122
DATED : November 7, 2000
INVENTOR(S) : Gary Lynn Miller et al.

Page 1 of 1

It is certified that error appears in the above-identified patent and that said Letters Patent is hereby corrected as shown below:

Claim 19,
Line 1, replace "16" with -- 14 --.

Claim 20,
Line 1, replace "16" with -- 14 --.

Signed and Sealed this

Sixth Day of November, 2001

*Attest:*

*Attesting Officer*

NICHOLAS P. GODICI
*Acting Director of the United States Patent and Trademark Office*